(12) United States Patent
Harinarayan et al.

(10) Patent No.: US 8,396,864 B1
(45) Date of Patent: Mar. 12, 2013

(54) CATEGORIZING DOCUMENTS

(75) Inventors: Venky Harinarayan, Saratoga, CA (US); Anand Rajaraman, Palo Alto, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 108 days.

(21) Appl. No.: 11/478,843

(22) Filed: Jun. 29, 2006

Related U.S. Application Data

(63) Continuation-in-part of application No. 11/172,612, filed on Jun. 29, 2005, now Pat. No. 8,176,041.

(60) Provisional application No. 60/695,712, filed on Jun. 29, 2005.

(51) Int. Cl.
G06F 17/30 (2006.01)

(52) U.S. Cl. ...................................................... 707/722

(58) Field of Classification Search .............. 707/3, 102, 707/722
See application file for complete search history.

(56) References Cited

U.S. PATENT DOCUMENTS

| | | | | |
|---|---|---|---|---|
| 6,098,064 A * | 8/2000 | Pirolli et al. | ............................ | 1/1 |
| 6,275,858 B1 * | 8/2001 | Bates et al. | .................... | 709/228 |
| 6,418,433 B1 * | 7/2002 | Chakrabarti et al. | ................. | 1/1 |
| 6,446,061 B1 * | 9/2002 | Doerre et al. | ................. | 707/738 |
| 6,549,896 B1 * | 4/2003 | Candan et al. | ......................... | 1/1 |
| 6,636,848 B1 * | 10/2003 | Aridor et al. | .................. | 707/728 |
| 6,647,381 B1 * | 11/2003 | Li et al. | ................. | 1/1 |
| 7,080,073 B1 * | 7/2006 | Jiang et al. | ............................ | 1/1 |
| 7,275,061 B1 * | 9/2007 | Kon et al. | ..................... | 707/102 |
| 7,318,057 B2 * | 1/2008 | Aridor et al. | .......................... | 1/1 |
| 7,730,054 B1 * | 6/2010 | Marmaros et al. | ............ | 707/713 |
| 2004/0030688 A1 * | 2/2004 | Aridor et al. | ..................... | 707/3 |
| 2005/0138056 A1 * | 6/2005 | Stefik et al. | ................... | 707/102 |
| 2005/0144162 A1 * | 6/2005 | Liang | ................. | 707/3 |
| 2005/0165753 A1 * | 7/2005 | Chen et al. | ........................ | 707/3 |

OTHER PUBLICATIONS

Borodin et al., Finding Authorities and Hubs From Link Structures on the World Wide Web, in Proceedings of the Tenth International World Wide Web Conference, Jan. 18, 2002.
Taher H. Haveliwala, Topic-Sensitive PageRank: A Context-Sensitive Ranking Algorithm for Web Search, in Proceedings of the Eleventh International World Wide Web Conference, 2002.
Jeh et al., Scaling Personalized Web Search, in Proceedings of the Twelfth International World Wide Web Conference, 2003.
Jon M. Kleinberg, Authoritative Sources in a Hyperlinked Environment, Journal of the ACM, 1999.
Lempel et al., The Stochastic Approach for Link-Structure Analysis (SALSA) and the TKC Effect, 2000.
Ng et al., Stable Algorithms for Link Analysis, in Proceedings the Twenty-Fourth Annual International ACM SIGIR Conference, 2001.
Page et al., The PageRank Citation Ranking: Bringing Order to the Web, 1998.
Richardson et al., The Intelligent Surfer: Probabilistic Combination of Link and Content Information in PageRank, 2002.
Soumen Chakrabarti, Mining the Web: Discovering Knowledge from Hypertext Data, 2002.

* cited by examiner

*Primary Examiner* — Sheree Brown
(74) *Attorney, Agent, or Firm* — David R. Stevens; Stevens Law Group

(57) ABSTRACT

Categorizing documents is disclosed. A hierarchy of topics is received. A seed for each topic is determined. One or more documents is received. The seed is used to evaluate the relevance of each document to one or more of the received topics. One or more topics is associated with each document.

22 Claims, 37 Drawing Sheets

| | Text Match Score | Family Doctor | Specialist | Women's Health | Kids | Dentistry |
|---|---|---|---|---|---|---|
| www.health.com/diabetes.html | 10 | 80 | 7 | 50 | 50 | 0 |
| mothertobe.com/diabetes.html | 9 | 50 | 10 | 90 | 75 | 0 |
| webmd.com/diabetes.html | 8 | 80 | 25 | 30 | 30 | 0 |
| cancer.org/pancreas.txt | 0 | | | | | |
| medschool.stanford.edu/users/joe/glucose.pdf | 6 | 5 | 90 | 10 | 10 | 0 |
| med.harvard.edu/~bchavez/contraindications.txt | 3 | 10 | 90 | 20 | 20 | 2 |
| diabetes.org/cancer/breast_cancer.doc | 5 | 50 | 50 | 90 | 5 | 0 |
| dentalschool.edu/contact_us.html | 0 | | | | | |
| women.com/TypeII/menopause.html | 6 | 60 | 60 | 95 | 5 | 0 |
| ... | ... | ... | ... | ... | ... | ... |
| ediet.org/precautions/sugar.html | 10 | 30 | 30 | 67 | 8 | 5 |
| health.com/cancer/ovarian/blood_tests.html | 6 | 50 | 10 | 88 | 2 | 0 |

FIG. 9B

|  | Original Random Walk | Dual Random Walk |
|---|---|---|
| Links | Inlinks, Outlinks | Invert the Link Direction |
| Outbound Link Probability | Uniformly Distributed | Proportional to Effective Page Rank (in Original Web Graph) of Destination: (Page Rank/ # Outlinks) |
| Outbound Teleportation | Uniform for All Pages $(1-\beta)$ | Inversely Proportional to Page Rank |
| Inbound Teleportation | Uniform (1/N) | Proportional to Page Rank |
| Page Rank | P(k) | P(k) |

FIG. 26

CATEGORIZING DOCUMENTS

This application claims priority to U.S. Provisional Patent Application No. 60/695,712 entitled ALGORITHMIC WEB CATEGORIZATION filed Jun. 29, 2005 which is incorporated herein by reference for all purposes; and this application is a continuation in part of U.S. patent application Ser. No. 11/172,612 entitled DELIVERING SEARCH RESULTS filed Jun. 29, 2005 now U.S. Pat. No. 8,176,041, which is incorporated herein by reference for all purposes.

BACKGROUND OF THE INVENTION

Search engines, such as are used in conjunction with the Word Wide Web, are typically expected to search through vast amounts of data, yet return a manageable number of quality, relevant results. Web directories and clustering engines both attempt to provide context to user queries. Web directories typically rely on humans—often volunteers—to hand select pages that are relevant to a given topic. Over inclusion and under inclusion are two significant problems that frequently occur with web directories. Humans include in the directory documents that don't belong, or are not the best documents on a given topic, while simultaneously failing to include better, more significant documents about a topic. Clustering engines attempt to remove human error by grouping results together based on textual cues in the search results. The groupings created by clustering engines are often arbitrary, such as by naming a group of documents after the word occurring most frequently in those documents (such as "fur" instead of "cat"), and are thus difficult for humans to use. Additionally, classification algorithms are typically slow and designed to work on small, clean corpora, such as a library collection, rather than documents the World Wide Web which is a very large and noisy environment. As with human classification, false positives and false negatives frequently result.

Therefore, there exists a continuing need to be able to provide relevant documents to users.

BRIEF SUMMARY OF THE INVENTION

Techniques for categorizing documents are described herein. A hierarchy of topics is received. A seed for each topic is determined. One or more documents is received. The seed is used to evaluate the relevance of the documents to one or more of the received topics. One or more topics is then associated with each document.

BRIEF DESCRIPTION OF THE DRAWINGS

Various embodiments of the invention are disclosed in the following detailed description and the accompanying drawings.

FIG. 9B illustrates an embodiment of data used by a search server.

FIG. 26 is a table illustrating properties of walks.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
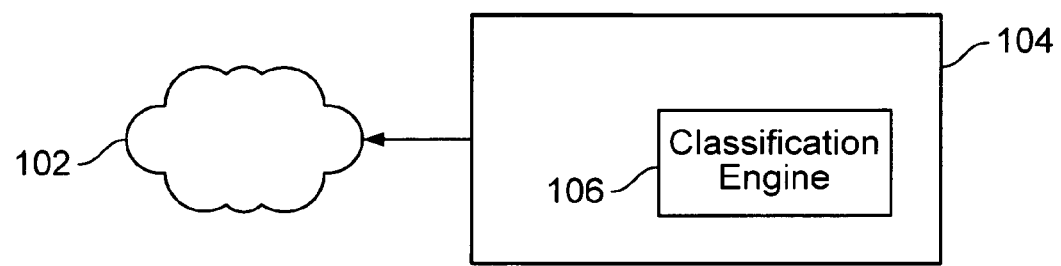
FIG. 1 illustrates an embodiment of a classification engine.

FIG. 1 illustrates an embodiment of a classification engine. In the example shown, collection 102 is a group of World Wide Web pages, and is crawled and indexed by a search system 104. Hereinafter, when an operation is discussed as being performed on each document in collection 102, it should be understood that the operation may instead be performed on a subset of collection 102, as applicable. The documents in collection 102 are also referred to herein as "web nodes" and "web pages." In some embodiments, collection 102 includes documents found on an intranet. Documents found in collection 102 can include, but are not limited to text files, multimedia files, and other content. Search system 104 may be a single device, or its functionality may be provided by multiple devices. Elements typically provided in a search system, such as an indexer and a repository, are not shown but may be included.

Each document in collection 102 can be thought of as belonging to one or more categories (also referred to herein, interchangeably, as topics). Classification engine 106 assigns a category (or one or more scores associated with a category) to each document in collection 102 based in part on how relevant that document is to the category. In some embodiments, classification engine 106 uses information such as the link structure between pages, as well as other factors such as page content and PageRank® or other scoring information. As described more fully below, once documents are reliably associated with categories, a variety of applications are possible. In some embodiments, classification engine 106 is not part of a search system (e.g., it is a standalone classification system) and/or other components of search system 104 are omitted.

Figure 2:
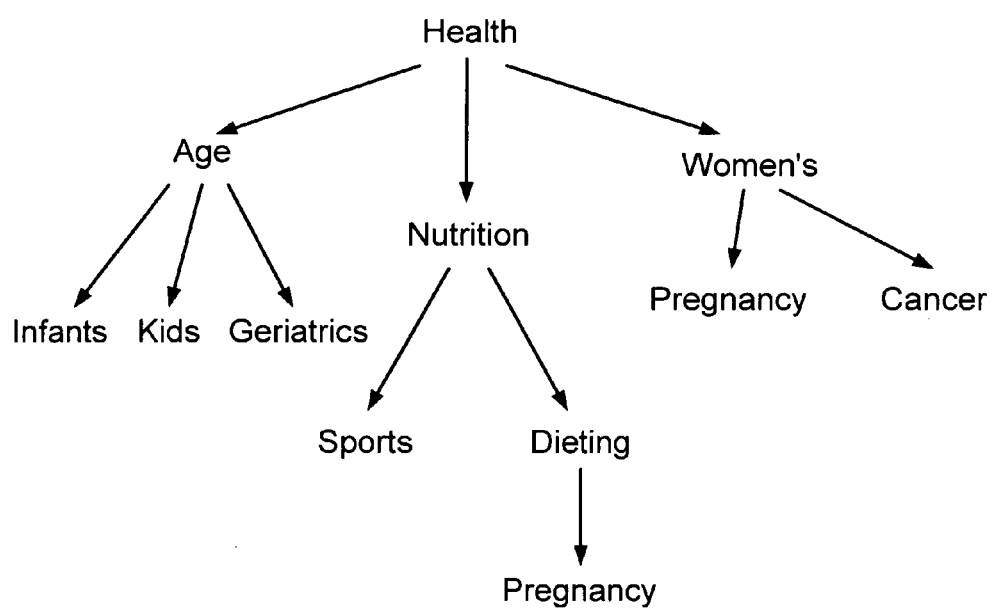
FIG. 2 illustrates a simplified example of a topic that has a hierarchy of subtopics.

FIG. 2 illustrates a simplified example of a topic that has a hierarchy of subtopics. A broad topic, or flavor, such as health, can be viewed as a collection of subtopics. For example, health information may be broadly classified according to subtopics such as aging, women's health, and nutrition. In practice, topics may be classified into many more subtopics. Within those subtopics, subsubtopics exist, such as infants and geriatrics within the subtopic of aging and pregnancy and cancer within the subtopic of women's health. These hierarchies can be used to perform more relevant searches, and to present results to users.

Figure 3:
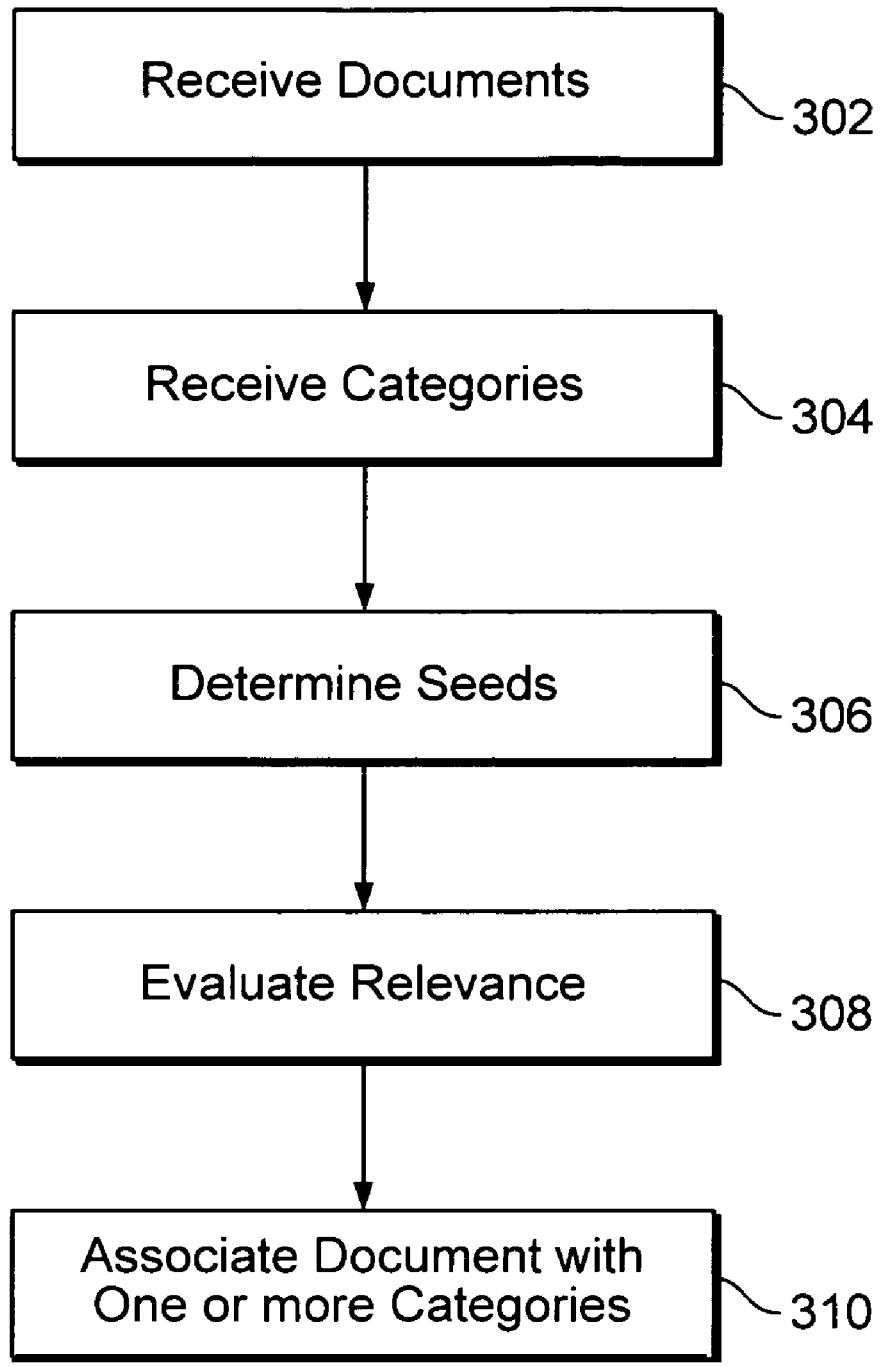
FIG. 3 illustrates an embodiment of a process for categorizing documents.

FIG. 3 illustrates an embodiment of a process for categorizing documents. The process begins at 302, when one or more documents is received. In the example shown in FIG. 1, documents are received as the result of the crawling and indexing performed by search system 104. In other embodiments, documents may be received in a different manner, such as from a third party.

At 304, a set of categories is received. Categories may be provided in various manners, such as by a human administrator. In some cases, categories may be obtained from a third party, such as the Open Directory Project. In some cases, categories may be computed. As used herein, broad, high-level categories, such as "Travel," "Health," and "Sports" are also referred to as "flavors." Categories are typically organized in a tree-shaped hierarchy, such as in the "Health" example shown in FIG. 2. In some cases, the hierarchy is flat. Such may be the case if the only categories received at 304 are peers, such as a set of topics consisting only of flavors, without any subtopics.

At 306, one or more seeds for each category is determined. For example, a Health flavor could be defined with an initial seed set of pages, such as webmd.com, mayoclinic.com, etc. In some embodiments, the seed sets are selected by a human and include pages that are considered to be useful or relevant to the topic associated with the flavor. For example, webmd.com provides a great deal of information on a variety of health topics. The seed sets can also be determined at least in part based on a directory service, such as the Open Directory Project. In some cases, seeds are determined based at least in part on the result of one or more terms. For example, a sports seed set can be constructed by using the 100 highest ranking (e.g., ranked by PageRank®) pages that contain the terms, "football," "basketball," and "soccer." The seed set associated with any particular flavor may be dynamic. For example, as better seeds for a topic are located, they may replace or join previously selected seeds and computations based on the original set of seeds can be updated as applicable.

As described in more detail below, at 308, at least a portion of the documents received at 302 are evaluated for their relevance to the categories received at 304. Documents determined to be relevant to a category are tagged or otherwise associated with that category at 310. In some embodiments, scores indicating the relevance of the document to each category received at 304 are associated with the document and stored at 310 in classification engine 106.

If a topic is reasonably well connected (most of the documents about a topic are linked to one another via short paths), one iteration of the process shown in FIG. 3 may be sufficient to accurately populate the portion of a taxonomy corresponding to that topic. However, if a topic is spread out in clusters, multiple iterations of portions of the process shown in FIG. 3 can be performed to achieve a more comprehensive result. In some embodiments, link based techniques, such as Topic Relevance (described in more detail below) are used to find pages that have a close "affinity" for (are related to) the seed set (308). Pages "similar" to the seed set are used to grow the seed set, such as through the Double Iterative Flavored Rank (hereinafter "DIFR") process (306) (also described in more detail below). The seed set is pruned as needed after each iteration (e.g., to mitigate topic drift).

Suppose a Health category is received at 204. At 306, a handful of good health pages such as www.webmd.com, www.mayoclinic.org, are selected, such as by an administrator. These pages are seed pages and are input into a Topic Relevance process. A Topic Relevance threshold is set, and pages having a Topic Relevance greater than the threshold are considered to belong to the Health category.

At this point, it is known that certain pages belong to the Health category. However, it is possible that there are other documents that ought to also be categorized as Health pages. One way to find them is to expand the seed set. One method of expanding the seeds set is to examine the source pages resulting from executing DIFR. Those source pages can be used as an updated seed to the Topic Relevance algorithm, from which the relevance of pages can again be calculated, and so on.

Figure 4A:
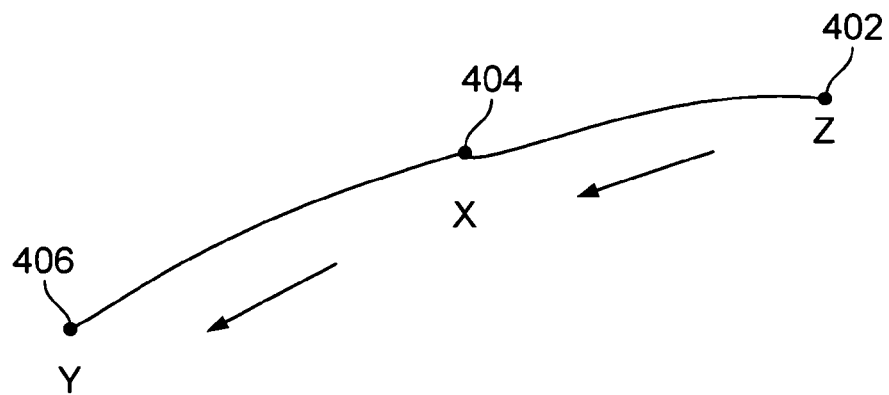
FIG. 4A illustrates an example of an embodiment of a page having affinity.

FIG. 4A illustrates an example of an embodiment of a page having affinity. A page can be defined as having good affinity to a seed page if, of all the paths or ways of getting to the page (e.g., links), most of them go through the seed page. In the example shown, Page Z (402) has an outlink to page X (404) and page X has an outlink to page Y (406). If only way to Y is generally by going through X (i.e., there are few independent ways to get to Y without going through X), then Y has affinity to X. The scenario shown in FIG. 4A is also referred to as "Y implies X." The reverse (that X implies Y) is not necessarily simultaneously true.

For example, a ticket sales page for a particular professional sports team likely has a high affinity for the main home page of the sports team. This is so because most people who purchase tickets do so by visiting the main site, then clicking on a ticketing link. This is true in part because pages maintained by fans about the team generally link to the main site, and do not link directly to the ticketing page, so there are few paths to the ticketing page that do not also include the main page.

As described in more detail below, affinity can also be conceptualized in terms of a random walk. Suppose a random walker walking the web can be in one of two states. Either the random walker has passed through X (is relevant to X), or the walker has not (is irrelevant to X). When a random walker first begins a walk, the walker's status is "not relevant to X"—an irrelevant random walker. If the walker's path takes the walker through X, the moment that the walker visits X, the walker becomes a "relevant (to X) walker." Conceptually, a relevant-to-X bit associated with the walker is flipped when the walker visits X, and remains flipped as the walker continues walking.

At some point, the random walker will teleport. The walker then becomes an irrelevant walker again. If the walker teleports directly to X, the walker's status is immediately set to "relevant to X." Otherwise, the walker's status will only be set to "relevant to X" if the walker's path takes the walker through page X.

If there are millions of random walkers, then at any point in time, there are many irrelevant-to-X and potentially many relevant-to-X walkers on the web graph. Conceptually, at any given point in time, there are many random walkers on page Y. Some of them may be irrelevant-to-X (haven't yet visited page X but are currently visiting page Y), and some of them may be relevant-to-X (visited page X at some point during the walk, before coming to page Y). The total number of random walkers on page Y determine its PageRank®. To determine a page's relevancy, the total number of relevant walkers is examined. If a large proportion of all of the random walkers on page Y are relevant-to-X walkers, then page Y is relevant to page X. Relevance is thus defined in some embodiments as the thresholded ratio of relevant surfers on the page to total surfers on the page.

Figure 4B:
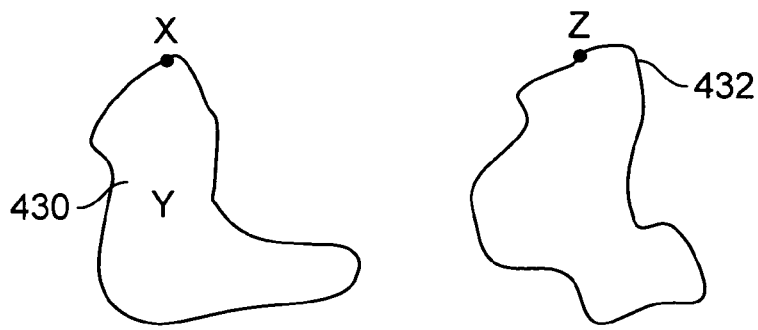
FIG. 4B illustrates an example of clustered documents.

FIG. 4B illustrates an example of clustered documents. Suppose there are many ways of reaching page Z that do not include visiting page X. Suppose also that the pages through which X is reached are the same pages through which Z is reached. Pages X and Z are defined to be "similar."

In the example shown if Y is selected as a seed (430), documents in group Z (432) will not be discovered because the groups are disjoint. For example, suppose a Football topic's sole seed is the main page of a particular team. That team will probably not link to the main page of other teams. Nonetheless, the other football teams' main pages are similar to that team's main page. As described in more detail below, DIFR is one technique that can be used to find similarity.

Figure 4C:
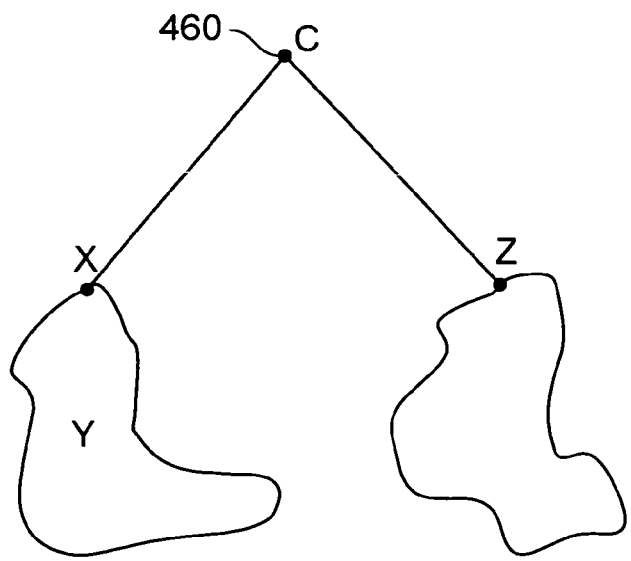
FIG. 4C illustrates an example of similarity according to one embodiment.

FIG. 4C illustrates an example of similarity according to one embodiment. Two pages A and B are defined to be similar if for any page C that links to A, with high probability page C also links to page B. In some embodiments, similarity includes short paths from page C in addition to direct links.

In the example shown, page C (460) links to documents in both groups. By using a similarity process, pages similar to page X, such as page Z will be discovered and can be added to the seed in addition to the original seed. As described in more detail below, in some embodiments, an affinity algorithm is used to prune the set and help prevent topic drift.

Similarity can also be defined in terms of a random walker. Pages A and B are similar if it is possible to find a page B such that when page A has a large affinity to a page C, page B also has a large affinity to page C. Suppose for a given page A, for all the pages in the Web (page $w_1$, $w_2$, etc.) there exists an affinity number ($a_1$, $a_2$, etc.), stored in a vector. B is similar to A if it has a similar vector.

One way of determining the similarities of the vectors is by taking their dot products. If the dot product is high, then the pages are similar. Pages A and B are similar if they share affinities for many pages. In the football team example, there are many common pages that will link to both the first team and a second team (e.g., nfl.org, espn.com, etc.) The dot product is high, so the two team pages are similar. In some embodiments, the affinity values are weighted. One way of doing this is to use PageRank®. So, for example, suppose www.stanford.edu links to both pages A and B. Suppose also that a spam site (e.g. JoeBobRulez.com) also links to pages A and B. Because www.stanford.edu has a much higher PageRank® than JoeBobRulez.com, Stanford's affinity value will be higher for A and B than JoeBobRulez.com's.

The techniques described herein can be used in a variety of contexts.

Example

Detecting Spam

The techniques described herein can be used to help detect spam, such as link-based spam pages. Spam pages frequently point to legitimate pages. For example, a spam page, S, may include outlinks to major search engines and/or popular commerce portals. It is frequently the inlinks of a spam page that are dubious.

In this example, affinity is defined in the dual graph, described in more detail below. Categorization engine 106 is configured to locate sites that link to spam page S (have page S as one of their respective outlinks). If a page Q points to spam page S and does not point anywhere else, then it is likely a spam page, too. Similarly, if a page has only short paths to other spam pages (e.g., it doesn't directly link to page S, but links to a third page which links to page S, either directly or through a small number of additional links), it is likely a spam page.

To detect spam, in some embodiments, a seed set of known spam is created. An inverted graph is constructed and pages with high affinity to the seed set in the inverse graph are determined. In some embodiments, in addition to reversing the links (outlinks become inlinks and vice versa), the weights on the links are also modified.

Figure 5:
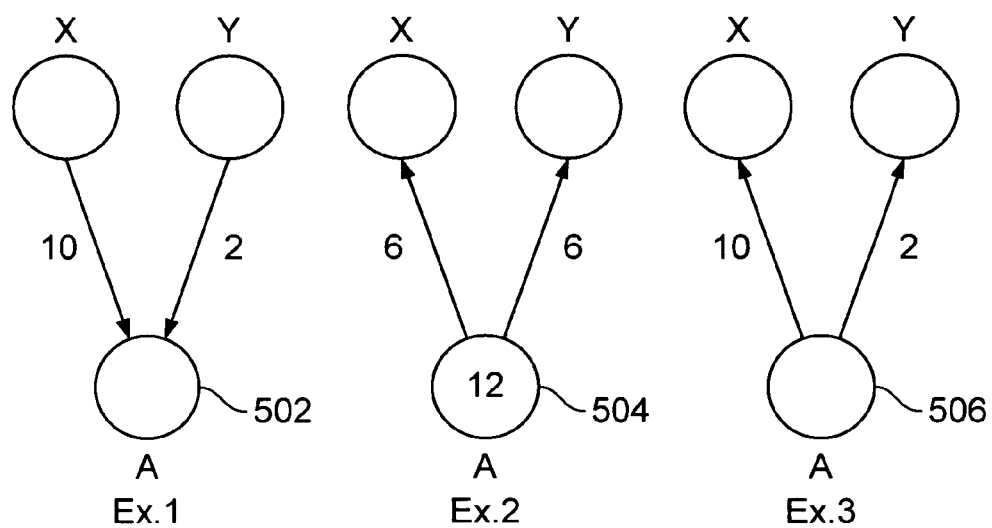
FIG. 5 illustrates an example of an embodiment of a dual web graph.

FIG. 5 illustrates an example of an embodiment of a dual web graph. A dual graph can define a dual random walk. To define a random walk, a graph and all of the transition probabilities on the link are determined. In Example 1 (502), page A receives ten visitors from page X and two visitors from page Y. If the graph is inverted, as shown in Example 2 (504), under the typical random walk rules, uniform probability is used to distribute points from page A to pages X and Y. As shown in Example 3 (506), the definition of a random walk can be modified to preserve flow. In the example shown, the transition probabilities are defined to be non-uniform so that the flows mimic the straight line graph.

In a spam detection example, a page can be defined as spam if it has a high affinity on the inverse graph to the seed set of known spam pages. Nodes that point to a spam page and only a spam page are suspect. In some embodiments, a rule is specified that most of a site's traffic must go to a spam site for it to be labeled a spam site itself. By preserving flows (e.g., as shown in Example 3), sites such as major search portals which point to many sites, some of which are spam, can be prevented from being miscategorized as spam. In some embodiments, existing spam detection techniques such as text matching are combined or augmented with categorized spam detection.

In one example, the following framework is used. Suppose link-based spam is recursively defined as follows. A page X is a spam page if there exists a page Y in the web graph that is a spam page, and each time X appears in a natural random walk, it is followed by Y (notated herein as "X=>Y"). Page X is a "bad" page since a random walker is exposed to spam shortly thereafter. In some embodiments, probabilities are used. The confidence that X=>Y gives the confidence that X is a spam page and ought to be classified as such. If X appears only once in the natural random walk, and it appears with Y, even if Y appears millions of times in the natural random walk, in this example X is still classified as spam.

One method of computing confidence of X=>Y is as follows: Consider a dual web graph. The relevance of X in flavor Y in the dual graph is the confidence that X is a spam page. In some embodiments, the seed set is given page rank weights, and flavor rank is computed, using delta>0 as a spam threshold function.

Example

Search

When attempting to determine which results are most relevant to a user, search engines generally evaluate prospective results for such factors as the number of occurrences of a search term and how close to the top of the document the search term occurs. In some cases, the relevancy of a particular result may depend on the context of the query. For example, suppose that a user submits a query of "jaguar price." Typically, search engines do not differentiate results based on context and thus the same hits will be displayed to the user, irrespective of whether that user is interested in the car, the cat, or the operating system. Similarly, a user wishing to learn the health benefits of taking a vacation may be inundated by travel-related sites by searching for "vacation" if the results are not constrained to the Health category. Categorization can be used to obtain and provide more relevant results to users.

Figure 6:
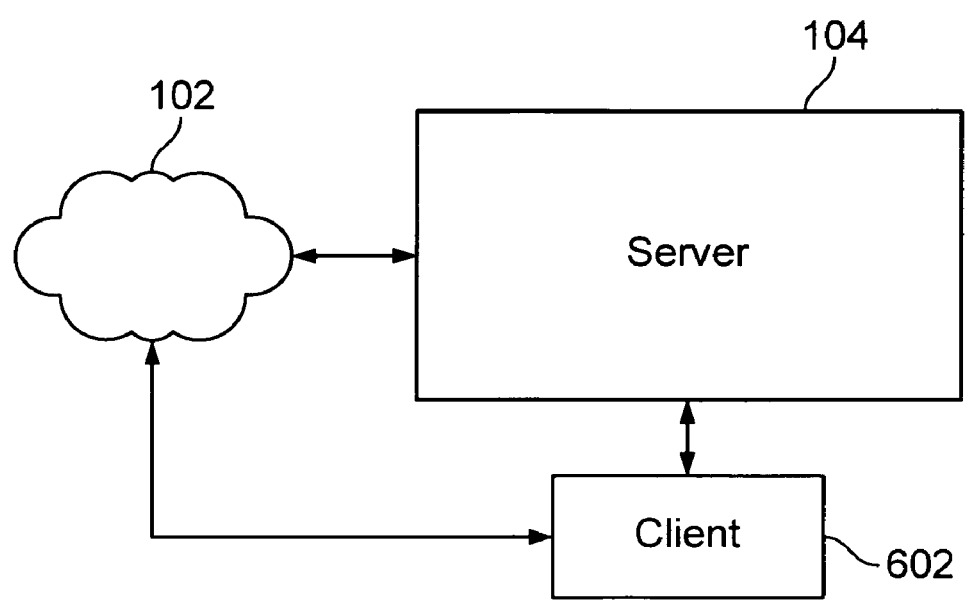
FIG. 6 illustrates an embodiment of a search system.

FIG. 6 illustrates an embodiment of a search system. In the example shown, collection 102 is a group of World Wide Web pages, and is crawled and indexed by a search server 104. Client 602 submits queries to search server 104, and search server 104 returns results from collection 102.

Search server 104 assigns scores to the documents in collection 102. In some embodiments, DIFR and/or Topic Relevance are used to score at least a portion of the documents in collection 102.

Figure 7:
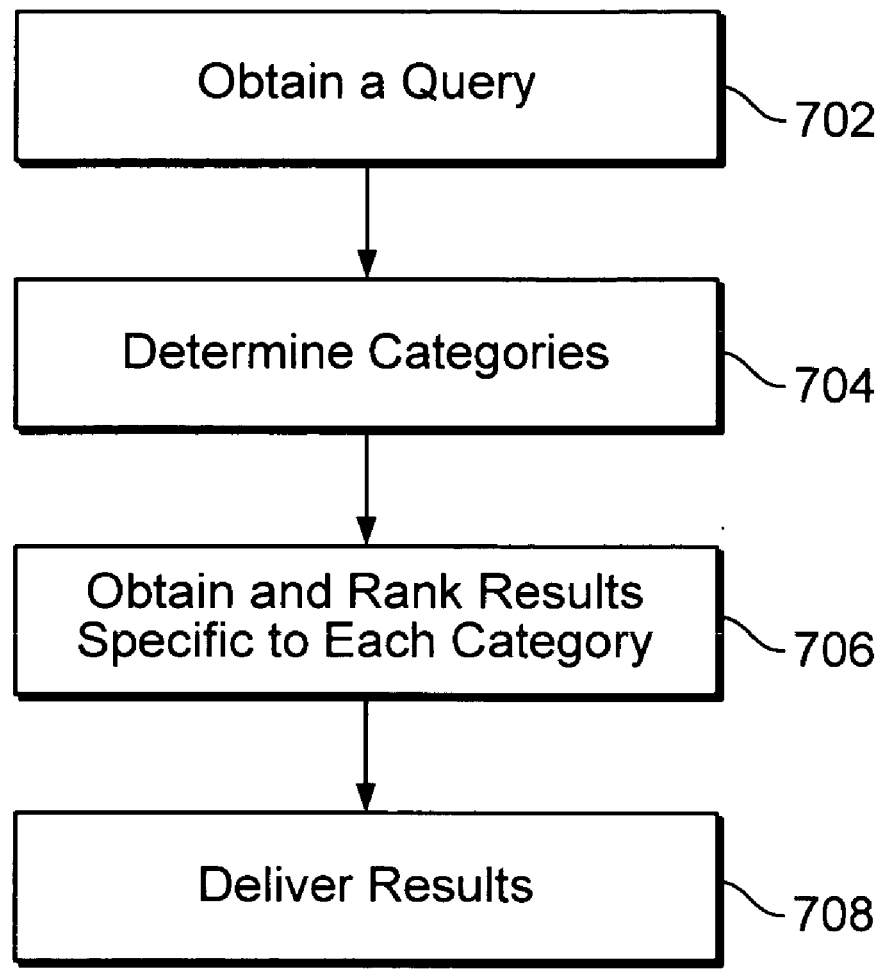
FIG. 7 illustrates an embodiment of a process for delivering a search result.

FIG. 7 illustrates an embodiment of a process for delivering a search result. The process begins at 702 when a query is obtained. The query may be obtained in a variety of ways. For example, at 702, a user may enter a search term into a web form provided by server 104 to client 602, a personal computer with a web browser. Other clients may also be used as applicable, such as a handheld device (such as a PDA), or a mobile phone.

At 704, a set of categories is determined. In some embodiments, portion 704 of the process shown in FIG. 11 corresponds with portion 304 of the process shown in FIG. 3.

In a conventional (unflavored) search, a web page is assigned a score, i.e. its link-score or Page Rank®, based on its context in a web graph. In a flavored (biased) search, web pages are assigned individual scores based on their relevance to an associated flavor and not just their context in the web graph.

At 706, results specific to each category are obtained and ranked. In some embodiments, flavored ranking is employed at 706. In that case, the obtained results (web pages) are individually ranked within each flavor (category) determined at 704. Depending on a variety of factors, such as available processing and storage resources, the processing performed at 706 may be performed on a subset of categories.

At 708, results are delivered to the user. As described more fully below, results may be presented to the user in a variety of ways.

Figures 8, 9A:
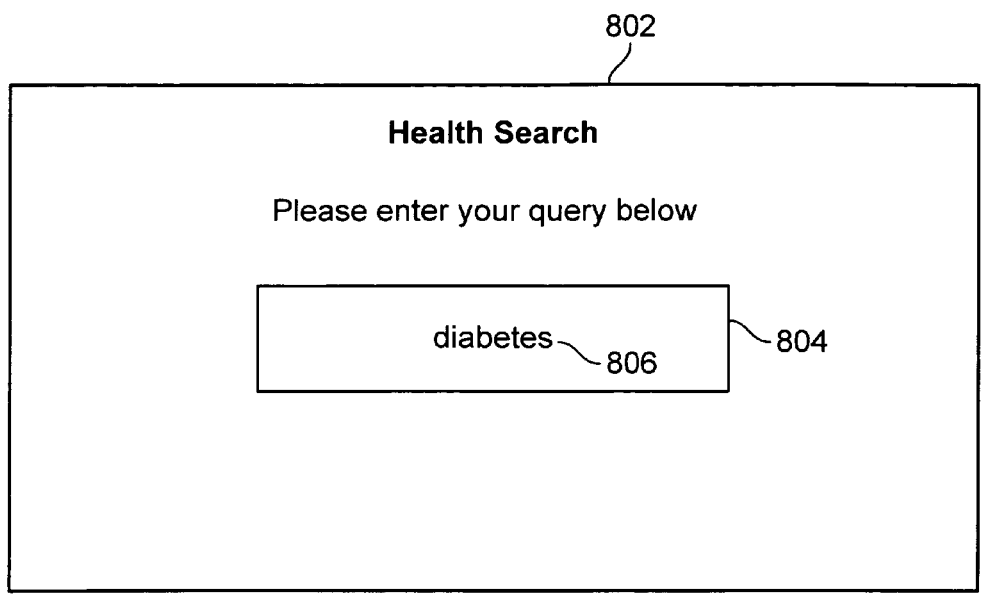
FIG. 8 illustrates an embodiment of an interface for obtaining a query.
FIG. 9A illustrates an embodiment of data used by a search server.

FIG. 8 illustrates an embodiment of an interface for obtaining a query. The example shown in FIG. 8 could be an example of an implementation of the process performed at 702 in FIG. 7. In this example, a web page 802 includes a form 804 into which a user can submit a query 806. Here, web page 802 is a topic-specific portal, aimed at providing visitors with topic-specific information and tools. Specifically, server 104 has been customized to provide health flavored results. In some embodiments, other flavors are provided, such as travel. Search server 104 may also be configured to provide general results, across a wide variety of topics. In the example shown, the user has entered a query of "diabetes" (806).

FIG. 9A illustrates an embodiment of data used by a search server. Matrix 900 is an abstraction of some of the data used by search server 104 and is used in implementations of portion 706 of FIG. 7.

Conceptually, a matrix 900 is created for every search term. In practice, optimized routines and data structures may be used. For example, rather than storing the entire matrix in memory, which could be prohibitively large, portions of the matrix may be computed as necessary, and/or the matrix may be approximated as appropriate. The list of pages and list of topics may be uniform across each matrix. However, the cells are populated differently for different search terms.

As shown, each matrix 900 has along one axis the URLs of all documents in collection 102 (902). Cells are populated by search server 104 based on assorted scores applicable to a particular page. For example, for each page, a text match score (904) is calculated. The text match score is typically a topic-independent score. It generally evaluates a page based on such factors as the occurrences of the search term, the placement of those occurrences (such as whether they are concentrated at the top of a document), and the font size and color of the term as it appears in a document. Other topic independent scores may also be stored, such as the document's PageRank®.

Along the other axis are topics (906), such as the categories determined at 704 of the process depicted in FIG. 7. For each topic, topic dependent scores are calculated. For example, flavor ranks (such as DIFR scores) and topic relevance scores are calculated, relative to each page. In this example, the DIFR and topic relevance scores of each page relative to a topic are combined into a composite score for that topic and are associated with the document (310 of FIG. 3). Other methods of assigning topic dependent scores to pages may be used, as appropriate.

Two types of "goodness" scores can be computed from a matrix. By summing the values down a column, a topic goodness score can be computed. A topic is generally good if many pages have a high score relative to that topic. In this example, Topic 1 has the highest topic goodness (908) and Topic 2 has the lowest topic goodness (910). One method of determining which topics are most relevant to a query is to sort the topic goodness scores of each topic, and select the highest ranking among them, such as the top 5 or top 10 topics. Other methods may also be used, such as setting a threshold at a particular value above which categories will be returned, irrespective of whether there are two or fifty.

A document's goodness relative to a particular topic can be computed by combining the document's topic independent score(s) with its topic dependent scores for that topic. In this example, the scores are combined through simple addition. Thus, Page 1 has a goodness score of 5, relative to Topic 1, and Page p has a goodness score of 15, relative to Topic 1. Other methods of combining scores may also be employed, such as by multiplying the scores or applying a more sophisticated equation.

By summing the values across a row, a document's total goodness score can be computed. A document may generally have a high total goodness score if it has a high goodness score relative to a few topics, or if it has a more modest goodness score relative to many topics. As described more fully below, documents with a high total goodness score may be especially good "General" results.

The information in matrix 900 can be used both to determine which topics are most relevant to a query, and within those topics, to determine which pages are most relevant.

FIG. 9B illustrates an embodiment of data used by a search server. The example shown is an illustration of a matrix 912 which has been computed for the query "diabetes," submitted to health flavored portal 802. Pages 914 and 916 both have text match scores of 0, indicating that the term, "diabetes" does not occur in them. In this example, those pages do not "match" the query and thus will not be returned as results. In other cases, partial or fuzzy matches may nonetheless receive text match scores or otherwise be permissible results.

For each document with a nonzero text match score, topic dependent scores are calculated. This corresponds to a portion of the processing performed at 706 in FIG. 7. In some embodiments, the set of documents having a nonzero text match score is the results set. The same number of results will be presented to a user, irrespective of which topic they select. However, the ordering of the results set will vary based on the topic.

For each topic, topic goodness scores are computed and ranked. This corresponds to a portion of the processing performed at 706 in FIG. 7. In this example, the top five ranking topics are "Family Doctor," "Specialist," "Women's Health," and "Kids." "Dentistry" is considerably less relevant to diabetes than the other topics are.

Family Doctor documents are generally articles that lay people can understand, and feature fewer complex medical terms or concepts. In contrast, Specialist documents are generally more technical, and may include academic journal articles. Women's Health documents may feature subtopics including pregnancy, menopause, and breast cancer. Kids documents may include discussion of topics such as the effects of pharmaceutics on children.

Within each topic, document goodnesses relative to that topic are compared. This corresponds to a portion of the processing performed at 706 in FIG. 7. In this example, URL 930 is the highest ranked document relative to the Women's Health topic, and so on. The highest ranked document (922) in the Dentistry category is a page located on a dieting website that describes some of the health problems of eating too much sugar. The same page has a much higher document goodness relative to several of the other topics.

Figure 10:
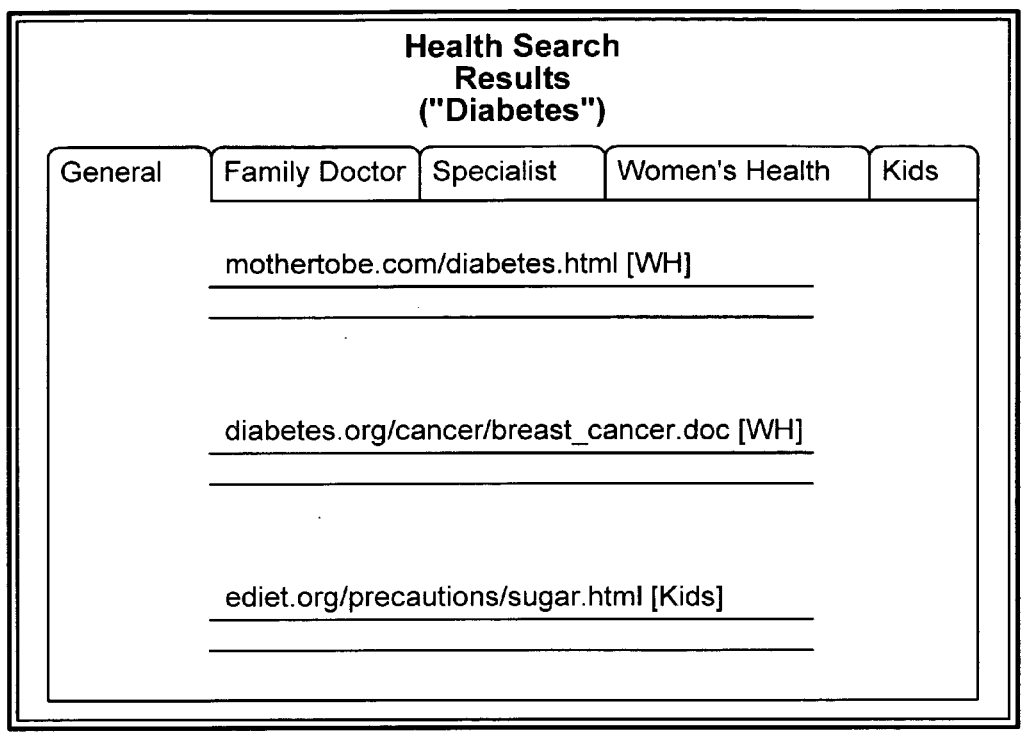
FIG. 10 illustrates an example of an embodiment of a display of search results.

FIG. 10 illustrates an example of an embodiment of a display of search results. The example shown in FIG. 10 could be an example of an implementation of portion 708 of FIG. 7. In the example shown, "diabetes" was determined to be most relevant to the health subcategories "Family Doctor," "Specialist," "Women's Health," and "Kids."

In this example, the "General" tab provides the user with results having the highest score across all categories. Links on the General tab include an indication of the category most relevant to the result. In the example shown, URLs 924, 926, and 922 had the highest total document goodness scores, respectively, and are presented as the top links under the General tab accordingly.

In some embodiments, General tab results are determined according to another scheme. For example, the General tab may include a handful of each of the top results from each of the other tabs instead of or in addition to other results.

As shown, the category or categories to which each document belongs is displayed along with the URL of the document. In some embodiments, documents are tagged with an indication, such as in metadata associated with the document, of the categories to which they belong. In other embodiments, the applicability of all pages to all topics is stored and thresholds are used to determine to which category a particular document belongs.

Figure 11:
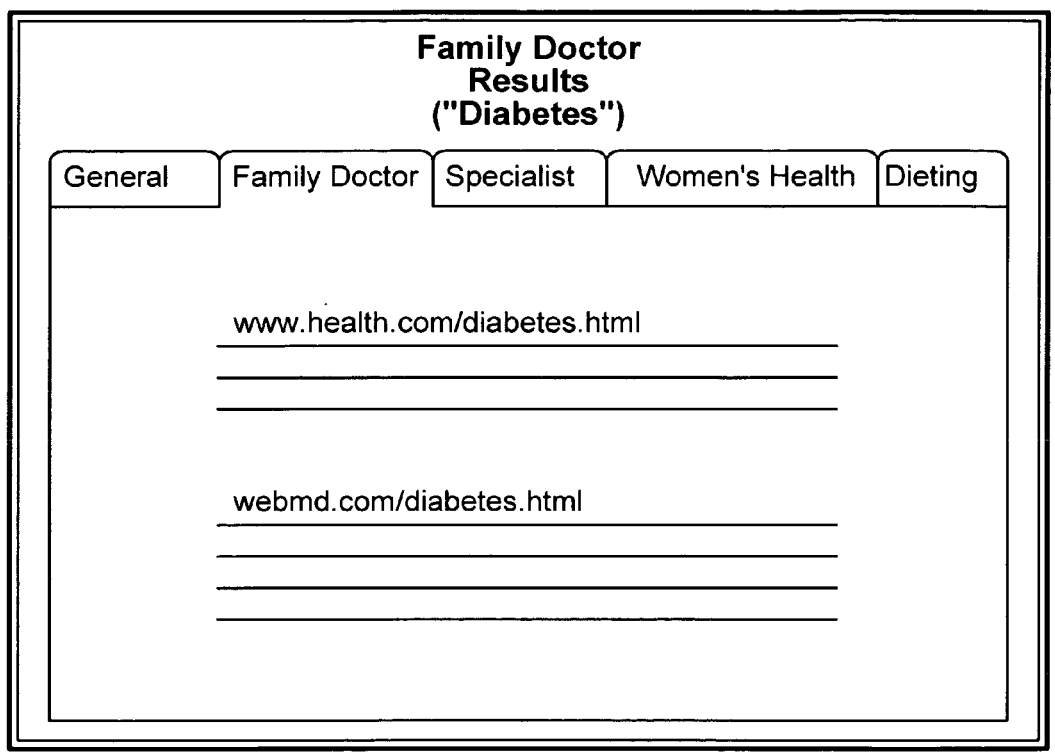
FIG. 11 illustrates an example of an embodiment of a display of search results.

FIG. 11 illustrates an example of an embodiment of a display of search results. In the example shown, a user has selected the Family Doctor tab of the results page shown in FIG. 10. The highest ranked pages relative to the Family Doctor topic are presented, accordingly. URLs 918 and 928 share the same relevance score relative to the Family Doctor topic. URL 918 has a higher text match score and is listed first. In other embodiments, other schemes may be used to break ties.

Figure 12:
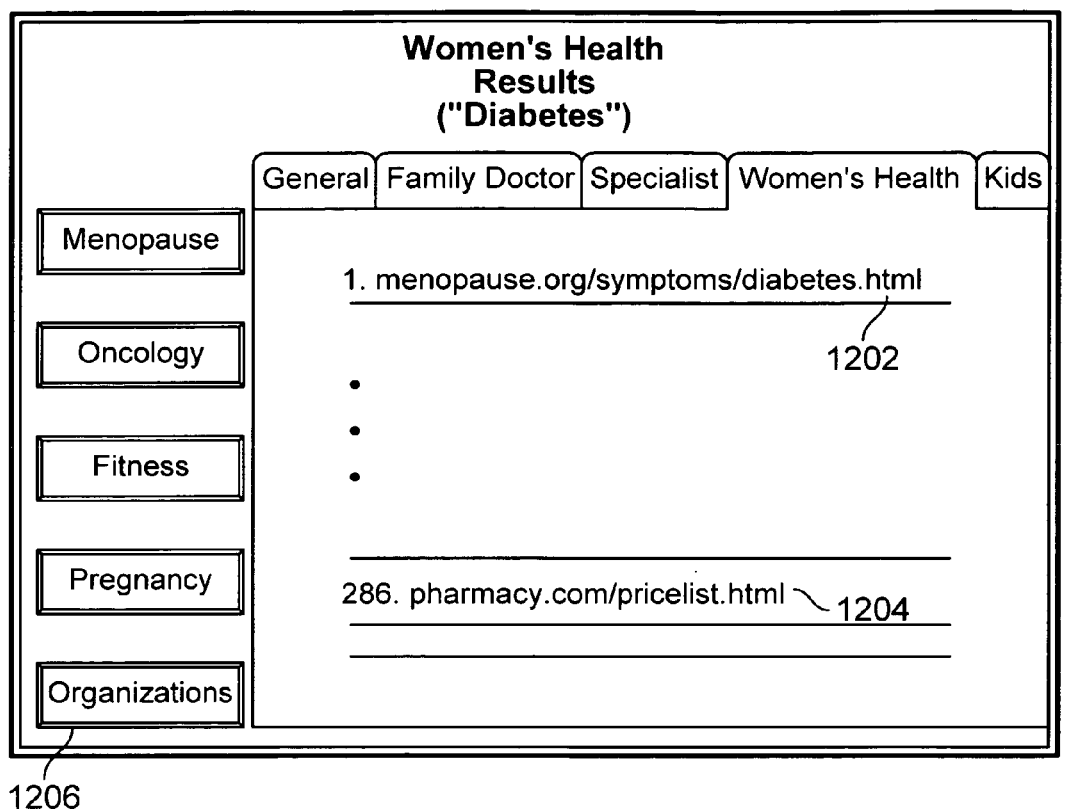
FIG. 12 illustrates an example of an embodiment of a display of search results.

FIG. 12 illustrates an example of an embodiment of a display of search results. In the example shown, a user has selected the Women's Health tab of the results page shown in FIG. 10. The Women's Health topic is further divided into subtopics. By selecting the Menopause subtopic within the women's health topic, the user is presented with the highest ranked pages having the highest relevance to the combined topics of diabetes and menopause. As shown, the highest ranking results provide the most relevant information on the intersection of the query and the intersection of the topics of women's health and menopause. In this example, result 1202 describes how diabetes affects menopause symptoms. In lower ranking result 1204, the terms "diabetes" and "menopause" both appear on a pharmaceutical price list but are independently discussed. By selecting the Organizations tab (1206), the user is presented with a list of one or more organizations associated with the query. For example, for the term "diabetes", a user may be presented with links to groups such as the American Diabetes Association.

Figure 13:
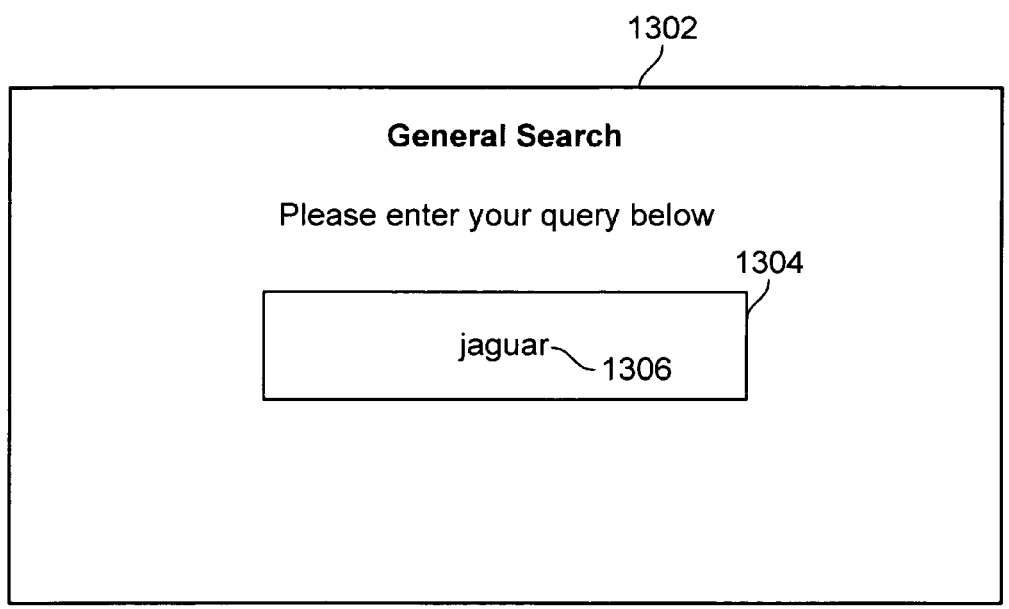
FIG. 13 illustrates an example of an embodiment of an interface for obtaining a query.

FIG. 13 illustrates an example of an embodiment of an interface for obtaining a query. The example shown in FIG. 13 could be an example of an implementation of portion 702 of FIG. 7. In this example, a web page 1302 includes a form 1304 into which a user can submit a query 1306. Here, web page 1302 provides general search capabilities, aimed at providing visitors the ability to search the entire web across all topics, rather than a topic-specific portal as depicted in FIG. 8. In the example shown, the user has entered a query of "jaguar" (1306).

Figure 14A:
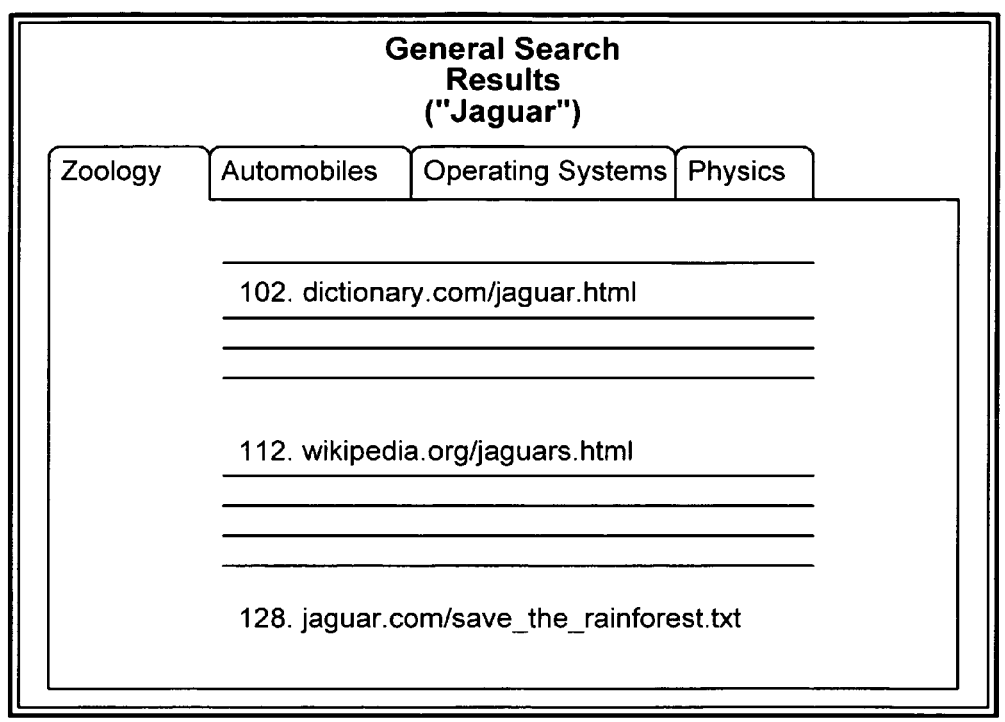
FIG. 14A illustrates an example of an embodiment of a display of search results.

FIG. 14A illustrates an example of an embodiment of a display of search results. The example shown in FIG. 14A could be an example of an implementation of portion 708 of FIG. 7. Search server 104, employing a matrix such as matrix 900, has determined that the topics most relevant to the query "jaguar" are Zoology, Automobiles, Operating Systems and Physics, respectively.

In the example shown, the first several results presented under the Zoology tab include URLs for zoos, large animal veterinarians, and so on. A link to a dictionary definition of "jaguar" is ranked 102nd. The dictionary definition is predominantly directed at describing the animal, but also mentions the automobile. Ranked 112th is an online encyclopedia entry that gives equal treatment to the animal, the automobile, the Jaguar operating system, and the physics book, "The Quark and the Jaguar." Ranked 128th is a page about jungle conservation efforts sponsored by the automobile manufacturer.

Figure 14B:
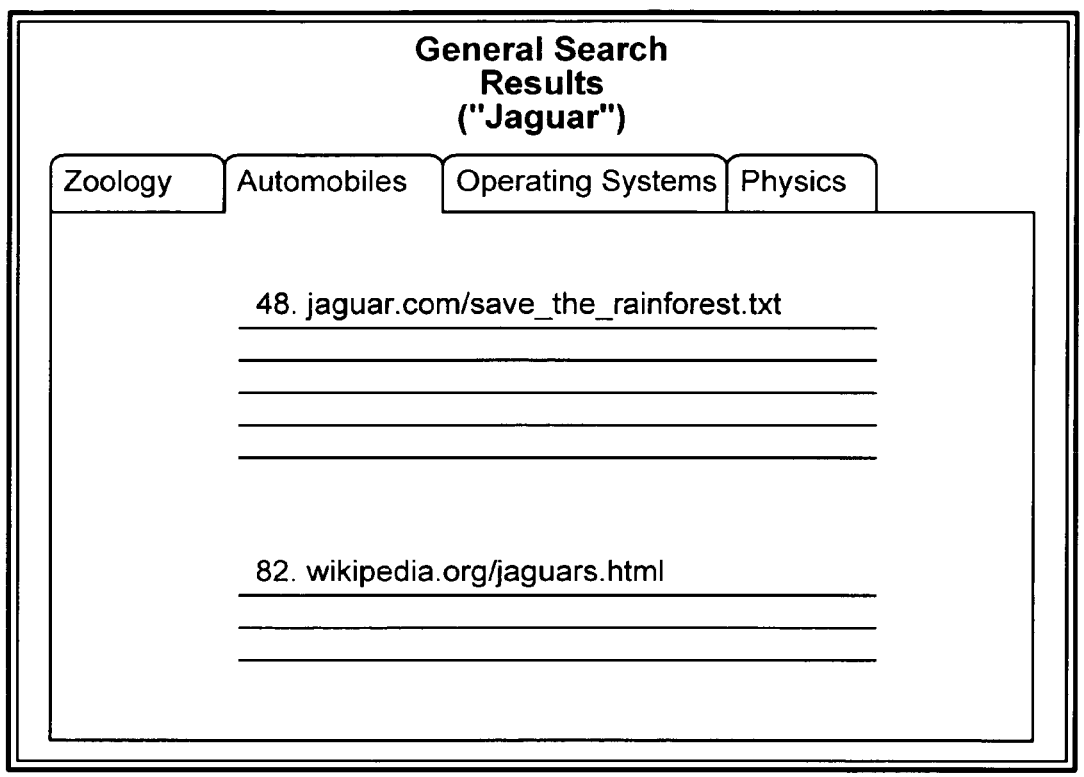
FIG. 14B illustrates an example of an embodiment of a display of search results.

FIG. 14B illustrates an example of an embodiment of a display of search results. In the example shown, the user has selected the Automobiles tab. The same results previously available under the Zoology tab are also available under the Automobiles tab. However, they are displayed in a different order. The results are now ranked based on their relevance relative to the topic of automobiles, rather than their relevance relative to the topic of zoology.

As shown in FIG. 14B, the conservation page sponsored by the automobile manufacturer is now ranked 48th. The encyclopedia article, having more information about the automobile than the dictionary definition, is ranked 82nd.

If the user clicked on the Operating Systems tab or the Physics tab, the encyclopedia article would likely appear higher in those results lists than the conservation page sponsored by the automobile manufacturer.

Example

Populating a Taxonomy

Documents in the World Wide Web can be automatically categorized into a taxonomy, such as the one shown in FIG. 2. Suppose each document in collection 102 is tagged with one or more categories, subcategories, etc., to which it belongs, such as categories received at 304 of FIG. 3. For example, suppose at 310 in the process shown in FIG. 3, documents having a Health score above a certain threshold have the term, "Health" inserted into metadata associated with the documents and stored in search system 104. Documents which have a "Kids," "Cancer," or other score exceeding a threshold are similarly tagged in addition to or instead of receiving a Health tag. In some embodiments, a populated taxonomy is generated and stored in system 104 by periodically performing the process shown in FIG. 3 and creating a directory of hyperlinks in which each page is represented as a leaf in the appropriate position in the taxonomy. For example, top scoring general Health pages are listed under the top node shown in FIG. 2, while more specific pages, such as a page on oncology is listed under the Cancer subtopic.

In some cases, a page may score sufficiently highly in multiple categories to merit listing the page under multiple portions of the taxonomy. For example, a page discussing pediatric diabetes may be listed under both the Health-Age-Kids subtopic and the Health-Nutrition-Dieting subtopic.

In some embodiments, the taxonomy is dynamically generated, based on what portion of the hierarchy a user is interested in interacting with. For example, in some embodiments, rather than computing and storing a taxonomy of the entire World Wide Web, only a portion of the documents in collection 102 are processed according the process shown in FIG. 3.

In some embodiments, a user is notified of the category to which a page belongs on the page itself, rather than or in addition to being able to locate the page within a visual hierarchy. For example, when a user visits a page discussing the toxicity of certain house plants, an indication, such as in the title bar of a web browser, or an interactive region, such as a mouseover or popup notification indicates the category (e.g., Health→Nutrition→Poison) to which the currently visited page belongs.

Example

Advertising

Typical advertising schemes generally require that an advertiser submit keywords that, when submitted by a surfer into an engine, will cause the advertiser's ad to appear. If it is known to which category or categories a page belongs, the effectiveness of marketing/merchandising can be improved.

Suppose a merchant is selling a particular widget. He supplies the URL of the widget (a "landing page" for the widget) to search server 104. Search server 104 examines the landing page and categorization engine 106 determines to which categories the landing page belongs. Categorization engine 106 can also determine related categories. Thus, related products (in the same category) can be determined, as well as other pages with a related category, and pages upon which to display an ad can be determined accordingly. For example, if a person is shopping for razors, related categories could include blades, aftershave, and bandages.

In some embodiments, metadata associated with a page is incorporated into the decision to display an ad. For example, if a page is located on a travel website, but the specific content of the page is not about travel, an ad server can be directed to nonetheless display a travel ad on that page. Using Health as an example, suppose a page A has a probability 80% that the words on the page belong in Health. By examining the advertiser's landing page and what its probabilities are, and comparing them to the probabilities of page A, it can be determined whether the widget advertisement is a good match for page A (e.g., that visitors to page A are likely to follow the link to the widget's landing page). For example, if the page is likely about health (tagged with a Health category), displaying a health related ad would generally be preferable to displaying a sports related ad, even though both pages contain a term such as "injury" as their most prominent keyword.

Example

Cuts of the Web

Comprehensiveness and relevance are generally inversely proportional to each other. The more comprehensive a set of information is, the less relevant it is because there are so many documents to sort through. If the set of documents is sufficiently narrow, however, it is possible that virtually no unrelated results will be returned.

Suppose resources such as memory and/or storage space is at a premium and only a subset of documents 102 can be stored/made use of. If users of that subset of information are only interested in a particular topic (e.g., Sports), a "cut" of the documents can be taken in which only pages having a Sports category score above a certain threshold are stored. For example, suppose a user has a personal digital assistant (PDA) or laptop with a relatively small amount of storage capacity. By taking a Sports cut of the web, sites such as ESPN.com may be automatically determined and stored in their entirety on the device to the exclusion of "Jane's Football Card Collection," a small site detailing a handful of football collectors' cards owned by a hobbyist (and to the exclusion of popular sites in other categories, such as pets.com). In some embodiments, cuts are based on branding, such as a Disney® or Cisco® cut of documents 102.

Example

Categorizing Blogs

There currently exist hundreds of thousands of blogs dedicated to a wide variety of assorted subject matter. People typically subscribe to the RSS feeds of blogs by name (URL), such as "Stacy's Life" (a blog of poetry written by a person named Stacy) or "Adventures of a Small Fish in a Big Pond" (a blog following a junior executive's experience climbing the corporate ladder). In conjunction with the classification techniques described herein, users can locate blogs focused on one or more topics of interest to them. For example, blogs tend to be very well linked. Using a seed of five health-related blogs, a universe of blogs that predominantly discuss health can be determined by classification engine 106. In some embodiments, a specialized blog reader is configured to query classification engine 106, the results of which are used to present a reader with a customized blog feed based on topic rather than name.

Example

Detecting Pornography

A pornography flavor can be created using a set of pornographic web sites as seeds. Pages can be categorized as pornography using the techniques described herein. The determination of whether a page belongs to the pornography category can be performed in the regular graph, or using the dual graph. Pornography sites do not typically point to non pornography sites. They point to one another. Thus, in some embodiments, a pornography categorization is used to determine whether a particular page is a pornography site and tag it accordingly. In some embodiments, the dual graph is used to penalize pages set up specifically to make money by directing users to pornography pages.

Double Iterative Flavored Rank

Figure 15:
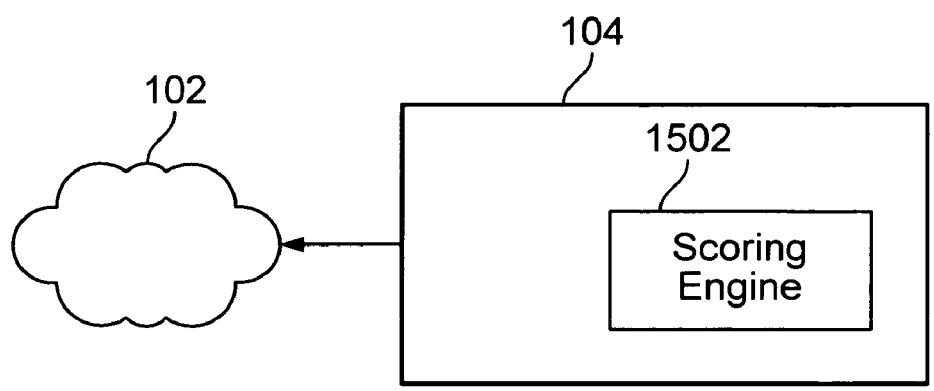
FIG. 15 illustrates an embodiment of a scoring engine.

FIG. 15 illustrates an embodiment of a scoring engine. In the example shown, collection 102 is a group of World Wide Web pages, and is crawled and indexed by a search system 104.

Each document in collection 102 can be thought of as serving two functions: that of a source, and that of a destination. Scoring engine 1502 assigns a source score and a destination score to each document in collection 102 based in part on how good of a source and destination, respectively, that document is. In some embodiments, scoring engine 1502 is not part of a search system (e.g., it is a standalone scoring system) and/or other components of search system 104 are omitted.

As described more fully below, the scores can be recursively defined in terms of each other.

These source and destination scores can be used to rank pages, for example in response to a search query, based on a variety of functions. In some cases, the source and destination scores of each page are combined into a single score using a weighted average. In some cases, the source scores are ignored and only the destination score is used. In some cases, good sources and good destinations are listed separately in the search results.

Figure 16A:
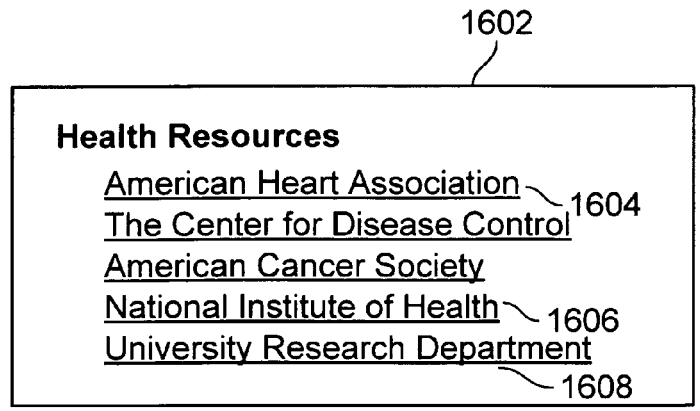
FIG. 16A illustrates an embodiment of a source.

FIG. 16A illustrates an embodiment of a source. In the example shown, a web page 1602, titled "Health Resources," contains a number of hyperlinks to websites, such as the American Heart Association (1604) and the National Institute of Health (1606).

A page can be defined as a "good" source for a topic (e.g., diabetes) if good destinations are "reachable" from it. Thus, a page is a good source for a topic if it guides a visitor in the direction of good destination pages for that topic. A good source need not (but may) contain authoritative information about a topic.

In the example shown in FIG. 16A, the American Heart Association page is reachable by web page 1602. This is so because web page 1602 contains a direct link (1604) to the American Heart Association page. Pages do not need to be directly linked to have reachability, however.

Figure 16B:
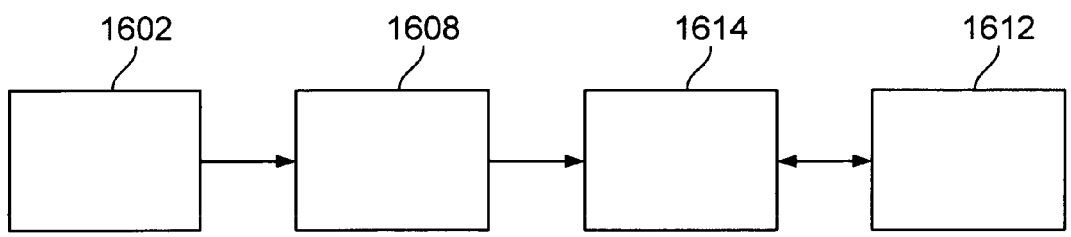
FIG. 16B illustrates an embodiment of pages having reachability.

FIG. 16B illustrates an embodiment of pages having reachability. The Health Resources page (1602) contains a link to a University Research Department page (1608). The University Research Department contains links to home pages for some of the individual researchers at the institution, such as page 1614. In the example shown, a researcher has written page 1612, a medical journal article on treating diabetes, which is linked to from the researcher's main page. Page 1612 is thus reachable from page 1602. As discussed more fully below, the reachability of a page can be conceptualized as the probability that a random surfer beginning on a first page will wind up on a second page.

Figure 16C:
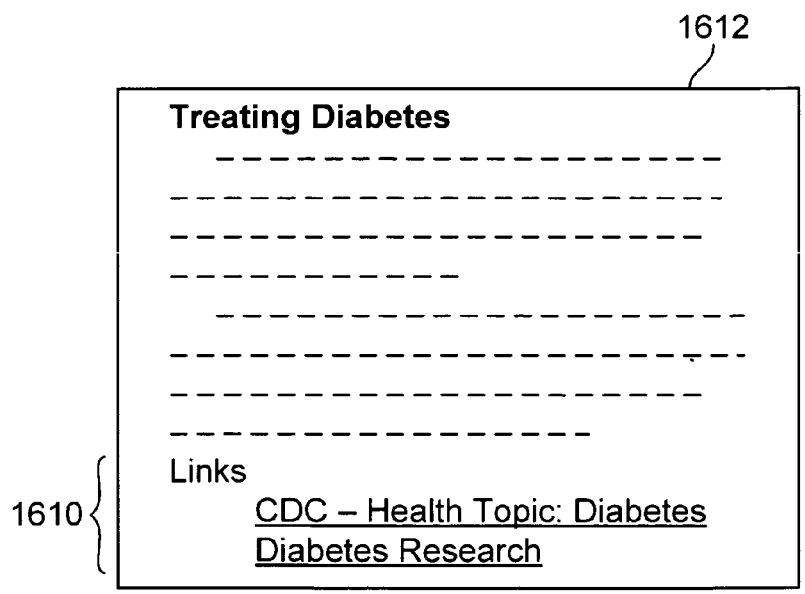
FIG. 16C illustrates an embodiment of a destination.

FIG. 16C illustrates an embodiment of a destination. In the example shown, a web page 1612, titled "Treating Diabetes," contains information about treating diabetes. A page can be defined as a "good" destination if it contains useful information about a topic and if that information is likely to be relevant to searches associated with that topic. The example shown also contains hyperlinks to other documents (1610), though such links are not necessary for a page to be a good destination. In some cases, a page may simultaneously be a good source and a good destination. This is the case, for example, with page 1612, because it presents information about the treatment of diabetes and also includes links for finding additional information about the topic.

Figure 17:
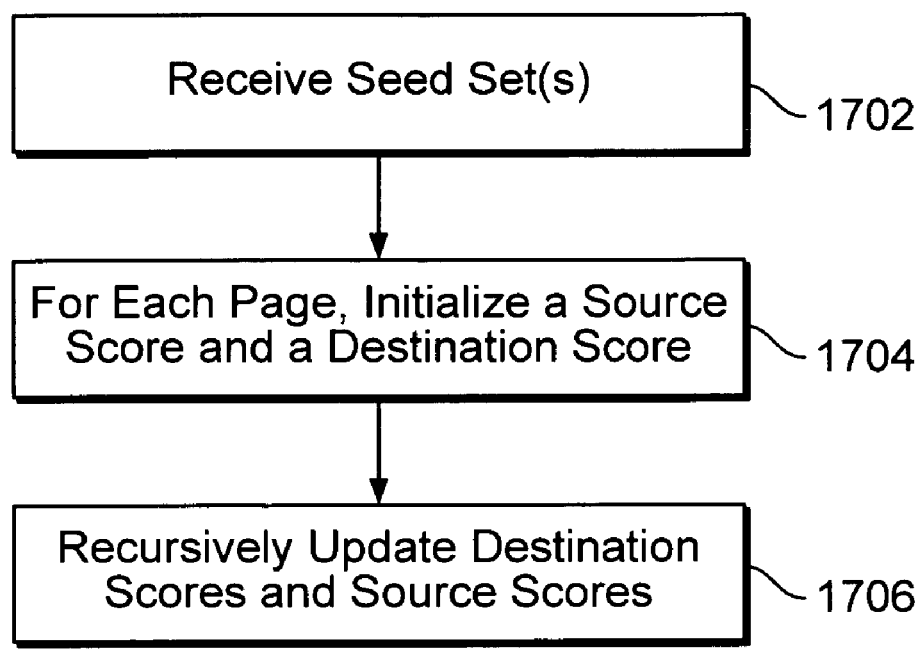
FIG. 17 illustrates an embodiment of a process for scoring documents.

FIG. 17 illustrates an embodiment of a process for scoring documents. This process may be implemented in scoring engine 1502. In the example shown, the process begins at 1702 when one or more seed sets is received. The seed set can either be a seed set "S" of sources for a given topic, or a seed set "D" of destinations for a given topic. In some embodiments, both source and destination sets are received at 1702. In some embodiments, the seed sets are selected by a human and include pages that are considered to be useful or relevant to the topic. In some embodiments, the seed sets are created at least in part based on a directory service, such as by creating a set based on links in a Directory Mozilla (DMOZ) category.

The pages included in sets S and D for a topic may be dynamic. For example, as better sources for a topic are located, they may replace or join previously selected seeds in S. Likewise, better destinations—ones with more relevant information or deeper treatment of a topic—may replace or join previously selected seeds in D. As described more fully below, in some embodiments, updating the seed sets occurs automatically, as part of a process for calculating source and destination scores for documents in collection 102.

The dynamic nature of seed sets can be especially important for providing relevant results to queries in topics where authoritative pages are likely to link only to "approved" content, such as positive or flattering information about that topic. Examples include sports teams, music groups, movies, famous personalities (e.g., actors, politicians, movie directors, etc.), companies, and polarized political issues, such as abortion rights. Team websites do not routinely link to fan pages, nor are such pages even reachable from team websites despite the fact that fan pages may contain highly useful and flattering information about a team. The websites of companies such as airlines and hotels do not generally link to (or reach) companies which provide similar services, yet a user interested in travel would generally benefit in a more complete picture of his or her carrier and lodging options. Similarly, an official movie website is unlikely to link to negative reviews of the movie or boycott sites such as moviexsucks.com which can provide potentially valuable information (including rumor and innuendo) about the movie in question.

The documents in collection 102 can be represented as a directed graph. In this example, the graph has N nodes, where N corresponds to the number of documents in collection 102. The directed connections between nodes represent the links between documents. For a particular page, p, Out(p) is the set of outlinks that lead from the page to other pages. These can be represented in the directed graph as forward links of a node p. Similarly, In(p) is the set of inlinks that lead from other pages to page p. These can be represented in the directed graph as backward links of a node p.

For example, in FIG. 16B, document 1602 has one outlink. Documents 1608 and 1612 both have one inlink and one outlink. Document 1614 has two inlinks and one outlink.

At 1704, for each document in collection 102, a source score and a destination score are initialized. One method of initializing the scores is through use of the following formula:

$$s(p) = \begin{cases} \frac{N}{|S|} & \text{if } p \in S \\ 0 & \text{if } p \notin S \end{cases} \quad (1)$$

$$d(p) = \begin{cases} \frac{1}{|D|} & \text{if } p \in D \\ 0 & \text{if } p \notin D \end{cases}$$

Where:
s(p) is the source score of a page p
d(p) is the destination score of a page p
p is a document in a collection
S is a set of source seeds
D is a set of destination seeds
N is the total number of documents in the collection In this example, vectors s and d encode the source and destination scores of a particular page p in collection 102, respectively. As explained above, N is the total number of documents, such as the total number of documents in collection 102. In some cases, N may instead be the number of pages in a subset of collection 102. In this example, each source seed in S is equally weighted and each destination seed in D is equally weighted. In some embodiments, other methods may be used for initialization, such as by setting specific values for particular pages. This may be the case, for example, where particular seed destinations in D are significantly "better" than other seed destinations in D.

At 1706, the destination and source scores of the documents in collection 102 are recursively updated. In the example shown, this is accomplished through use of a random surfer model.

In a typical random surfer model (referred to herein as the unbiased model, performed by an unbiased surfer), a surfer starts at a random page on the web and begins surfing. If the surfer is currently at page p, the page q that the surfer visits at the next time step is determined in the unbiased model as follows: with probability β, the surfer picks a link uniformly at random from the set of outlinks of p, and follows it to reach a new page; with probability 1−β, the surfer randomly teleports to a page picked uniformly at random from all of the pages on the World Wide Web. The value β is typically set to 0.85.

For each page p in collection 102, the probability that the unbiased surfer visits p at the current time step converges to a value that depends only on the link structure of the web. This probability is the unbiased stationary probability of page p and is referred to herein as the "unbiased stationary probability" of page p. The vector r that lists, for each page, its unbiased stationary probability is referred to herein as the unbiased stationary probability vector r, and can be given as:

$$r = \beta A r + (1-\beta)u \quad (2)$$

Where:
r is the unbiased stationary probability vector
β is a probability, typically set to 0.85
A is a matrix that encodes the link structure of a collection
u is a vector corresponding to uniform random teleportation If there are N pages in collection 102, u has N entries, each equal to 1/N.

Suppose a random surfer preferentially teleports to good sources, rather than teleporting in an unbiased fashion, such as is given above. In this case, the probability that the surfer teleports to a particular page p can be set proportional to the source score of p, s(p). Thus, the surfer teleports to each source with a probability proportional to its source score. A teleport vector for the surfer can be written as $$\frac{s}{|s|},$$

with the factor $$\frac{1}{|s|}$$

normalizing the sum of all the probabilities to 1.

In this example, the link structure of collection 102 is encoded using a matrix A. In general, if page j links to page i, then $$A_{ij} = \frac{1}{|\text{Out}(j)|},$$

and if not, $A_{ij}=0$. A vector b of stationary probabilities for this "biased" walk can be defined by the following formula:

$$b = \beta A b + \frac{(1-\beta)}{|s|} s \qquad (3)$$

Where:
b is a biased stationary probability vector
β is a probability, typically set to 0.85
A is a matrix that encodes the link structure of a collection
s is a source score vector With probability β, the surfer picks a link uniformly at random from the outlinks of p and follows it to reach a new page. With probability 1−β, the surfer teleports to a source s. In this example, every page in collection 102 has at least one outlink. In practice, some pages do not contain outlinks. In that case, such pages can be eliminated using successive sink elimination, and the stationary probability values can be modified as appropriate.

In this example, the destination score of a particular page p (denoted d(p)) is equal to b(p), the page's stationary probability in this biased walk.

Destination scores can be used to compute source scores. Suppose a random surfer has a teleport set that consists only of page p. In such a case, the teleport vector $v_p$ has 1 corresponding to p and 0 corresponding to all other pages. Here, the surfer teleports periodically to page p and continues the random walk from p. This type of walk is referred to hereinafter as a random surfer centered on p and the stationary probability $r_p$ for this random surfer can be given as:

$$r_p = \beta A r_p + (1-\beta) v_p \qquad (4)$$

Where:
$r_p$ is a stationary probability vector centered on p
β is a probability, typically set to 0.85
A is a matrix that encodes the link structure of a collection
$v_p$ is a teleport vector centered on p This equation is actually a set of N equations, one for each page p in collection 102.

The source score of a particular page p can be defined in this example as $r_p(p)$, the stationary probability that the random surfer is on a good destination page (as measured by the goodness of its destination score). Conceptually, a source score is important if important destinations have received a significant portion of their destination scores from the source. One way of defining the source score is given below:

$$s(p) = \sum_{q \in N} r_p(q) d(q) \qquad (5)$$

Where:
s(p) is the source score of a page p
$r_p(q)$ is a stationary probability with respect to p of q
d(q) is the destination score of a page q Here, set N is the set of all pages in collection 102, and page q is a document in collection 102. The source score of a particular page p is calculated by summing the stationary probability with respect to p of each page q multiplied by the destination score of q. To simplify notation in this example, the source score of p can be written as:

$$s(p) = r_p^T \cdot d \qquad (6)$$

In some cases, a popular page q, such as www.yahoo.com, will have a high r(q), where r is the unbiased stationary probability vector, defined above in Equation 2. Because www.yahoo.com has such a high unbiased stationary probability overall, there is a high probability that it will also have a high value of $r_p(q)$. In general, a page p should not be given credit for leading to a universally popular destination, such as www.yahoo.com. One way to correct for this is to define a relative stationary probability of q with respect to p, denoted $w_p(q)$, by:

$$w_p(q) = \frac{r_p(q)}{r(q)} \qquad (7)$$

Where:
$w_p(q)$ is the relative stationary probability of a page q with respect to a page p
$r_p(q)$ is a stationary probability with respect to p of q
r(q) is the unbiased probability of a page q.

The source score of p can then be written as:

$$s(p) = \sum_{q \in P} \frac{r_p(q)}{r(q)} d(q) = w_p^T \cdot d \qquad (8)$$

Where:
s(p) is the source score of a page p
$r_p(q)$ is a stationary probability with respect to p of q
r(q) is the unbiased probability of a page q
d(q) is the destination score of a page q
P is a collection of pages The above definitions of source and destination score allow the source and destination scores to diffuse away from the original seed set. Without correction, the diffusion can quickly lead to topic drift and topic generalization. Topic drift occurs when the set of sources gets "contaminated" by pages that are not relevant to the topic at hand. A related problem is topic generalization. For example, suppose a ranking for the topic "marathon running" is constructed. Many pages on running and other outdoor activities are likely to link to sites about marathons. Such sites will likely receive high source scores, thereby recursively enlarging the destination sites. The result is that the ranking may be for the broader topic of "running" rather than the desired topic of "marathon running."

Two parameters, ρ and φ can be chosen that control how much weight to assign new sources and destinations, as opposed to those in the original seed sets. The parameter ρ is known as the destination expansion factor and the parameter φ is known as the source expansion factor. These factors allow some of the probability contained with the seed sets to spread out into documents in collection 102 that were not originally seeds, while retaining a portion of the probability within the seed sets. Thus, the parameters allow for the control of how much a final source or destination score of a page p will depend on the original seed sets.

Here, $0 \leq \rho \leq 1$ and $0 \leq \phi \leq 1$. Using these parameters, the destination score and source score equations can be written, respectively, as:

$$d(p) = \begin{cases} \frac{\rho}{|D|} + (1-\rho)b(p) & \text{if } p \in D \\ (1-\rho)b(p) & \text{if } p \notin D \end{cases} \quad (9)$$

$$s(p) = \begin{cases} \frac{N\phi}{|S|} + (1-\phi)w_p^T \cdot d & \text{if } p \in S \\ (1-\phi)w_p^T \cdot d & \text{if } p \notin S \end{cases} \quad (10)$$

Where:
d(p) is the destination score of a page p
s(p) is the source score of a page p
ρ is a value between 0 and 1, inclusive ($0 \leq \rho \leq 1$)
φ is a value between 0 and 1, inclusive ($0 \leq \phi \leq 1$)
p is a document in a collection
S is a set of source seeds
D is a set of destination seeds In this example, ρ and φ are the percentage of the scores remain within their respective, original, sets, and 1−ρ and 1−φ are the percentage of the scores may drift out. There are a few special cases that can occur depending on how the ρ and φ values are selected. If ρ and φ are both set to 1, the source and destination scores will be held constant at their initial values. If ρ and φ are both set to 0, unbiased source and destination scores result. If ρ is set to 1 and φ is set to 0, the destination set will be fixed and only the source scores will vary. If ρ is set to 0 and φ is set to 1, the source scores will be constant and only the destination scores will vary.

The equations presented in conjunction with portion 1706 of FIG. 17 are given in part to help conceptualize a process for computing source and destination scores. While the equations presented can be used to compute source and destination scores, to do so would require, for each page p, a very large number of computations, especially when collection 102 is large. As described more fully below, in some embodiments, more efficient processes are employed to iteratively calculate source and destination scores, such as are described in conjunction with FIGS. 5 and 6.

A simplified numeric example of an iterative version of the process shown in FIGS. 17 and 5 is given in FIGS. 18A-18E to help illustrate the process conceptually.

Figure 18A:
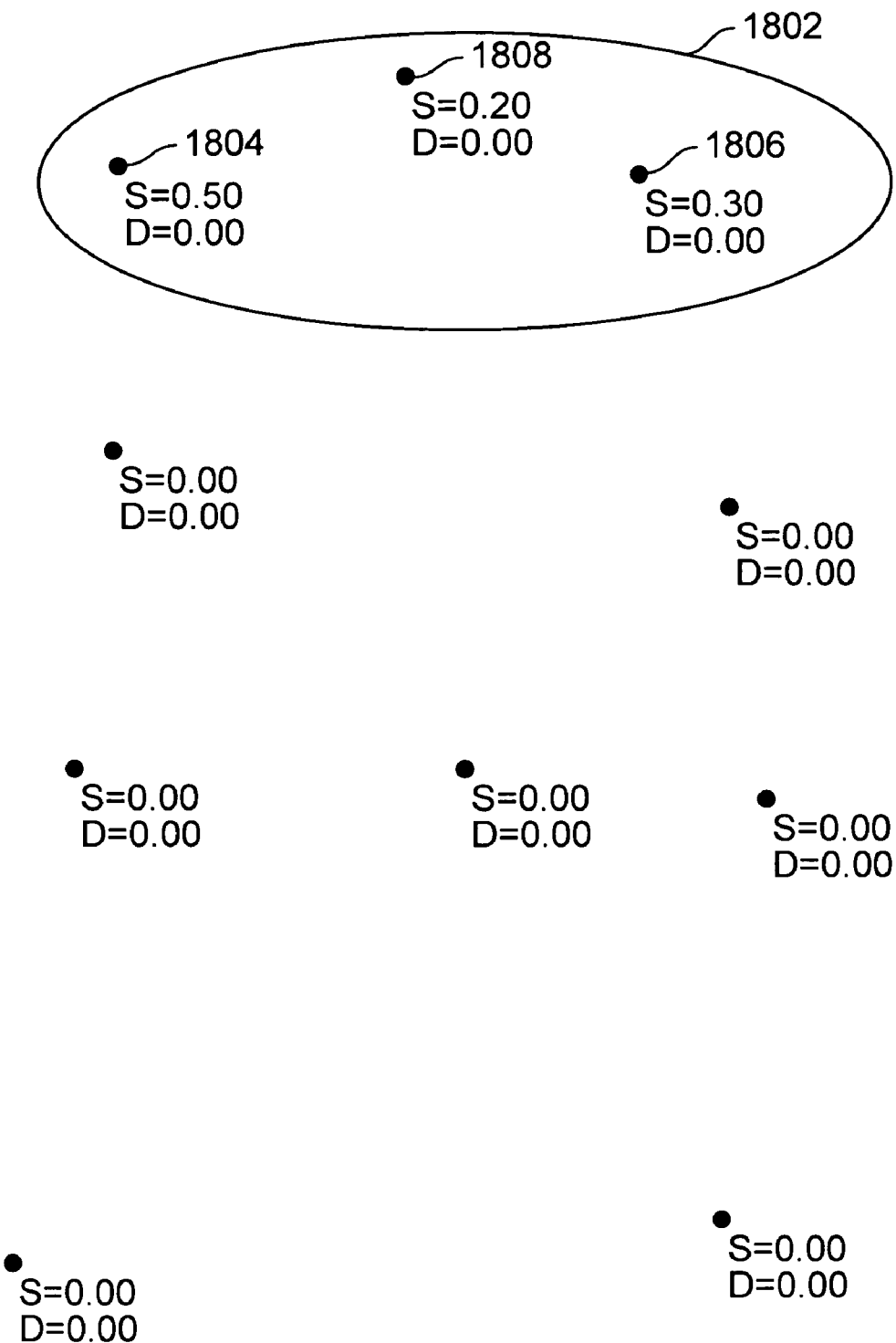
FIG. 18A illustrates a simplified embodiment of a portion of a process for assigning scores to a collection of documents based on a source set.

FIG. 18A illustrates a simplified embodiment of a portion of a process for assigning scores to a collection of documents based on a source set. The process depicted in FIG. 18A could be an example of an implementation of portions 1702 of FIG. 17 and 1904 of FIG. 19 as applied to collection 102. The example shown uses a simplified numerical method for calculating destination scores (d(q)) that are reached during a series of random walks beginning at each node p in the seed set. In the example shown, each node q that is visited during a random walk originating at p is assigned a score given by $d(q) = s(p) - 0.1(i^2)$, where i is the distance from the particular source seed p, and s(p) is the source score of that p. Here, distance is defined as the number of hops q is away from p. In this example, if a particular q is visited by multiple ps, the resulting destination scores are summed. If a computed value of a d(q) is negative, in this example, it is set to 0.

For simplicity of illustration, the values given in FIGS. 18A-18E are not normalized to maintain a unity, and are significantly larger than they would likely be in practice, where millions of documents may be included in collection 102.

In the example shown, nodes 1804, 1806, and 1808 are included in a source seed set 1802. Their source seed values are 0.5, 0.3, and 7.0, respectively. Their destination scores are each 0. The other nodes in collection 102 have their source and destination scores initialized to 0.

Figure 18B:
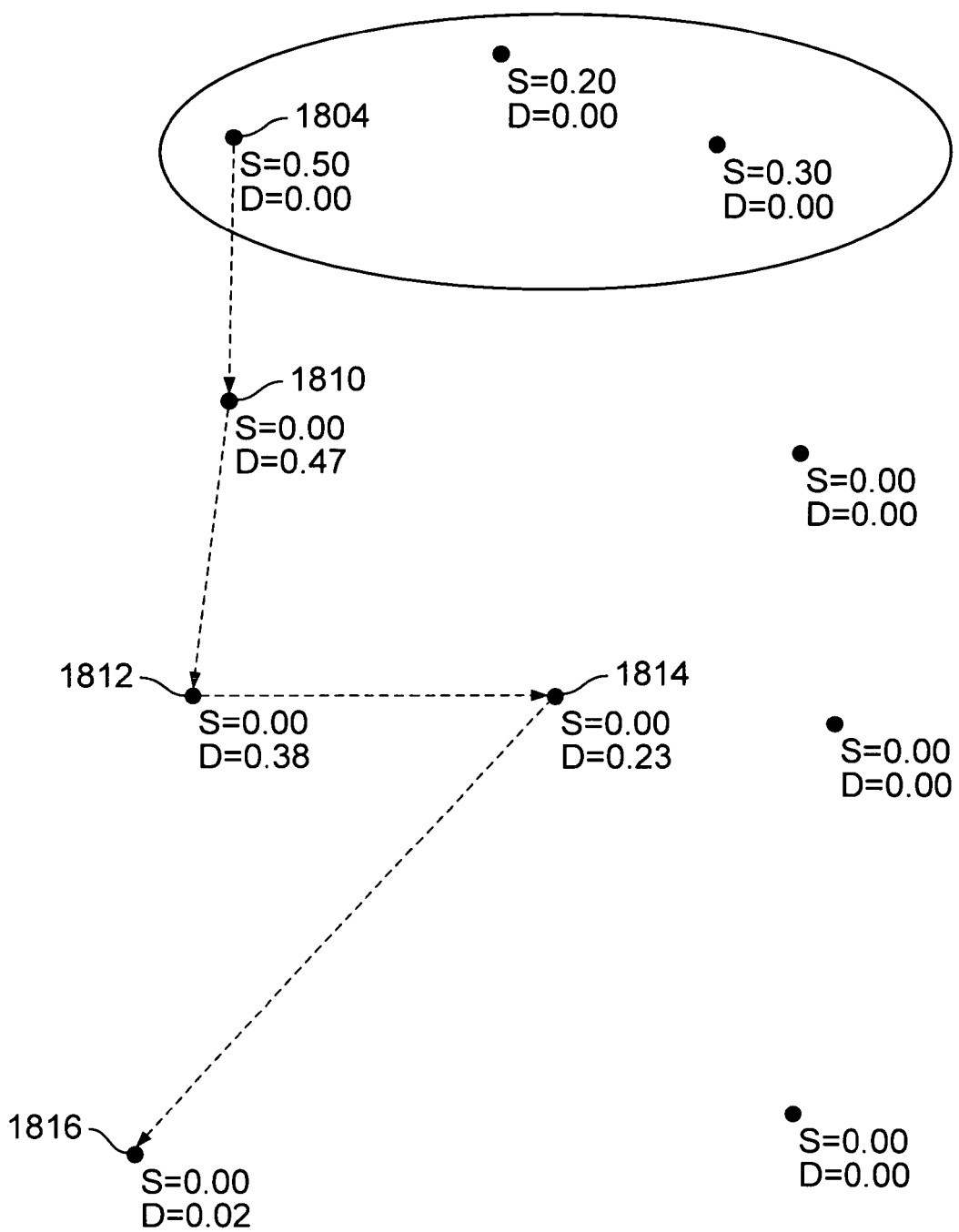
FIG. 18B illustrates a simplified embodiment of a portion of a process for assigning scores to a collection of documents based on a source set.

FIG. 18B illustrates a simplified embodiment of a portion of a process for assigning scores to a collection of documents based on a source set. The process depicted in FIG. 18B could be an example of an implementation of 1706 of FIG. 17 and 1906 of FIG. 19. A random walk beginning at node 1804 is performed. The first page reached from node 1804 is node 1810. Node 1810 thus receives as its destination score a portion of node 1804's source score. In this case, the received score is 0.47. The second page reached from node 1804 is node 1812. Node 1812 receives a destination score of 0.38. The third page reached from node 1804 is node 1814. Node 1814 receives a destination score of 0.23. The final page reached from node 1804 is node 1816. Node 1816 receives a destination score of 0.02. After traversing to node 1816, the random walk teleports.

Figure 18C:
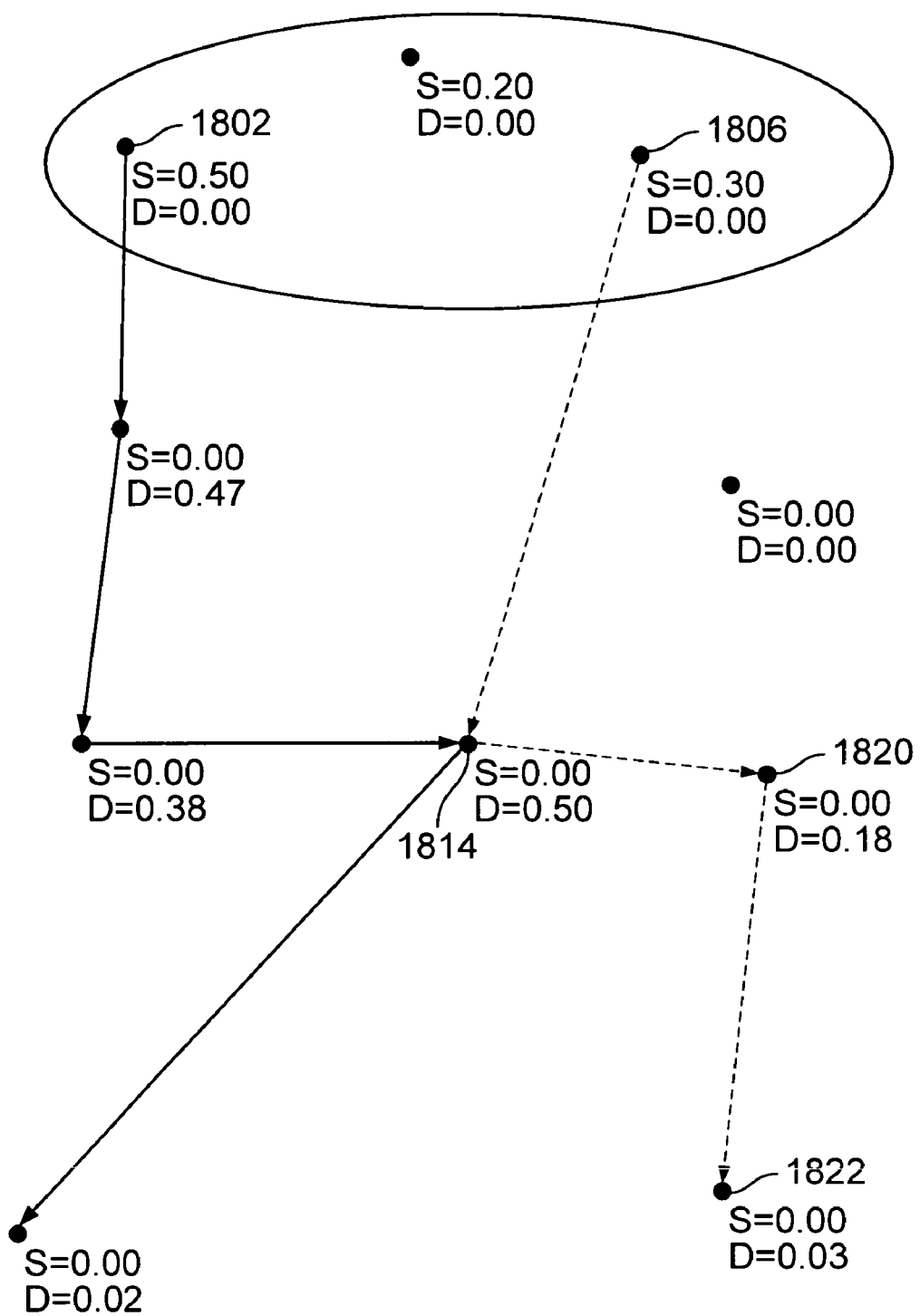
FIG. 18C illustrates a simplified embodiment of a portion of a process for assigning scores to a collection of documents based on a source set.

FIG. 18C illustrates a simplified embodiment of a portion of a process for assigning scores to a collection of documents based on a source set. A random walk beginning at node 1806 is performed. The first page reached from node 1806 is node 1814. In this example, node 1814 was already reached from node 1802 as illustrated in FIG. 18B. As a result, the portion of node 1806's source score (in this case, 0.27) is added to the portion of node 1804's score (as shown in FIG. 18B, 0.23), for a total destination score of 0.50. The second page reached from node 1806 is node 1820. Node 1820 receives a destination score of 0.18. The final page reached from node 1806 before teleport is node 1822. Node 1822 receives a destination score of 0.03.

Figure 18D:
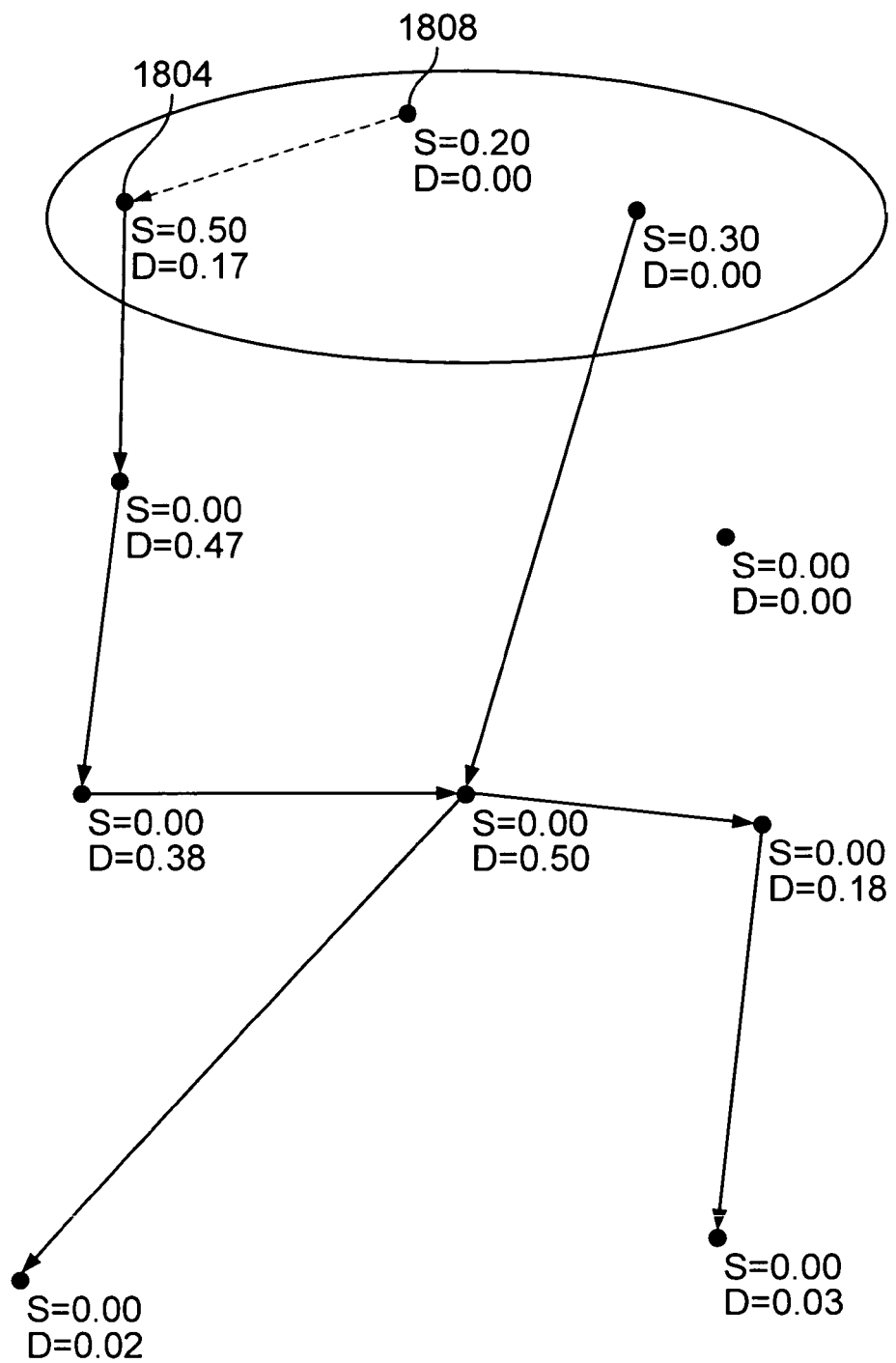
FIG. 18D illustrates a simplified embodiment of a portion of a process for assigning scores to a collection of documents based on a source set.

FIG. 18D illustrates a simplified embodiment of a portion of a process for assigning scores to a collection of documents based on a source set. A random walk beginning at 1808 is performed. In this case, the first page reached from node 1808 is another source seed node, node 1804. Node 1804 receives a destination score of 0.17. At this stage in the example, a random walk starting at each node in the seed set has been made.

Figure 18E:
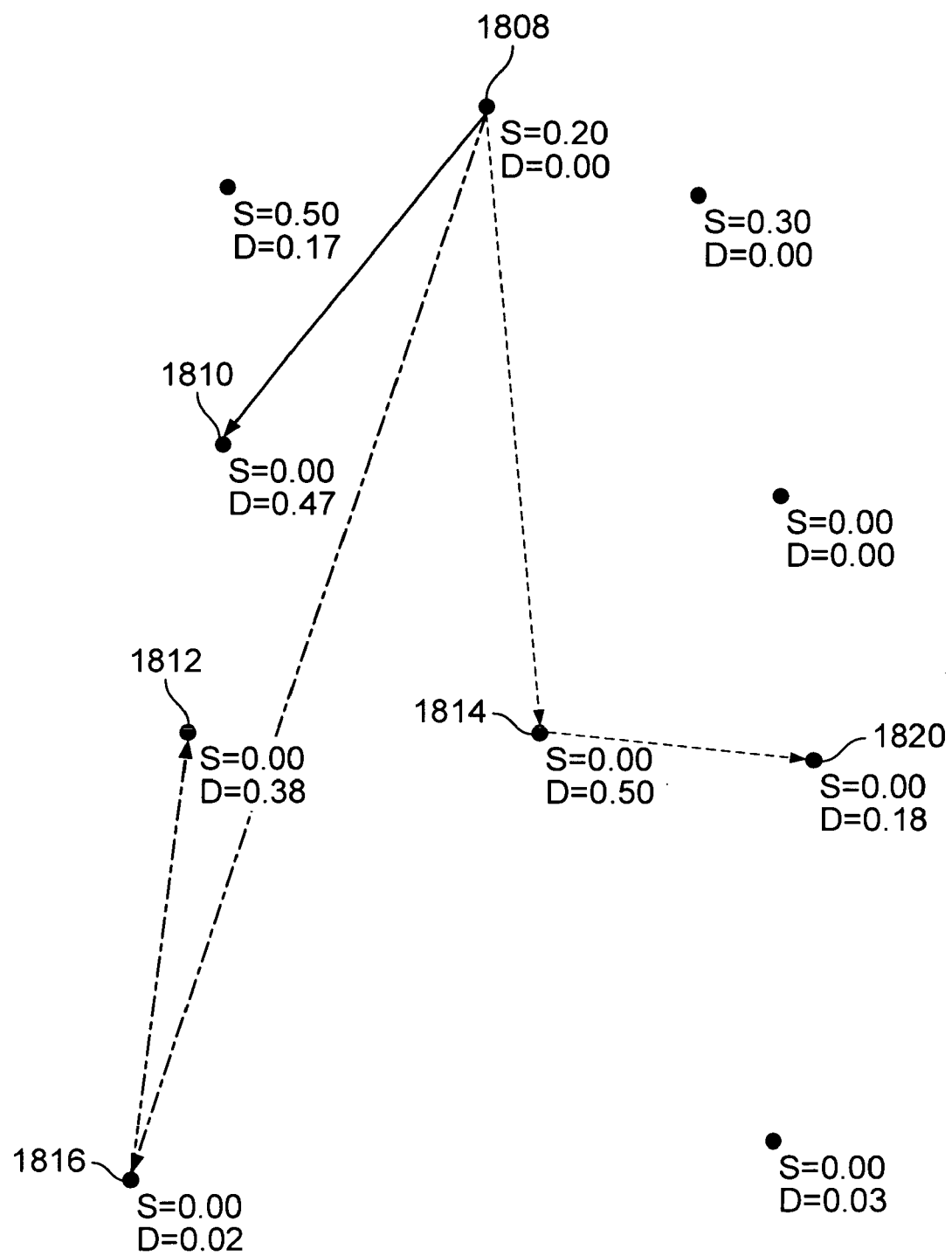
FIG. 18E illustrates a simplified embodiment of a portion of a process for assigning scores to a collection of documents based on a source set.

FIG. 18E illustrates a simplified embodiment of a portion of a process for assigning scores to a collection of documents based on a source set. The process depicted in FIG. 18E could be an example of an implementation of 1706 of FIG. 17 and 1908 of FIG. 19 as applied to collection 102. A source score for a page p can be calculated by determining the percentage of destination score that a page q has received from p and multiplying that by the destination score. The process is repeated for each q, and the results are summed. In the example shown, nodes 1810, 1814, 1820, 1816, and 1812 have each received some portion of destination score from node 1808. The source score of node 1808 could thus be calculated as the percentage of destination score that node 1810 received from node 1808 multiplied by 0.47, summed with the amount of percentage of destination score that node 1816 received from node 1808 multiplied by 0.02, and so on.

Once source scores have been computed for each node in collection 102, a new seed set can be constructed. In some embodiments, all nodes with non-zero source scores are used to form the updated set S. In some embodiments, a threshold is applied. In that case, nodes not previously in S may be added to S if their source scores are large enough. In some embodiments, nodes previously in S whose source scores have decreased may be demoted out of set S. Once a new seed set has been constructed, the process can begin again, and additional computations, such as the additional iterations 1908 and 1910 of FIG. 19 can be performed.

Figure 19:
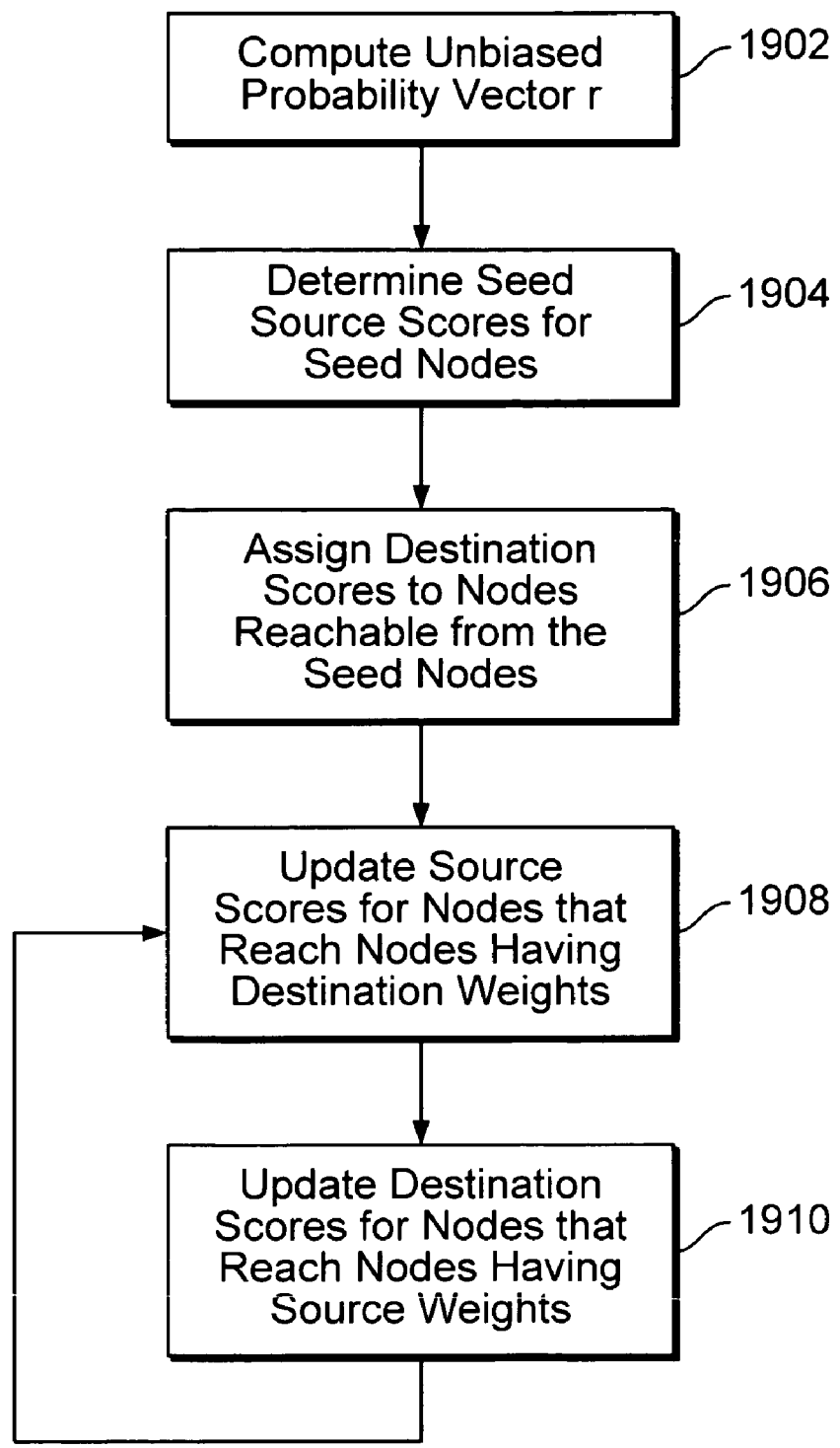
FIG. 19 illustrates an embodiment of a process for assigning scores to a collection of documents based on a source set.

FIG. 19 illustrates an embodiment of a process for assigning scores to a collection of documents based on a source set. In the example shown, the random surfer is modeled through an iterative process. The process begins at 1902 when an unbiased stationary probability vector r is computed, such as through use of the formula given in Equation 2. At 1904, each seed node in the source set is assigned a source seed score. The source and destination scores of the pages in collection 102 are optionally initialized, such as through use of the procedure discussed in conjunction with 1704 of FIG. 17. In this example, the destination vector d is initialized to ρd and the source vector s is initialized to φs. Vectors b and z are initialized to 0.

At 1906, destination scores are assigned to nodes reachable from the source seeds. One method for calculating destination scores is as follows:

$$b(p) = \beta \sum_{q \in In(p)} \frac{b(q)}{|Out(q)|} + \frac{(1-\beta)}{N} s(p) \quad (11)$$

$$d(p) = \rho d(p) + (1-\rho) b(p)$$

Where:

d(p) is the destination score of a page p

β is a probability, typically set to 0.85

In(p) is the set of inlinks of a page p

Out(q) is the set of outlinks of a page q

N is the total number of documents in the collection

ρ is a value between 0 and 1, inclusive ($0 \leq \rho \leq 1$)

φ is a value between 0 and 1, inclusive ($0 \leq \phi \leq 1$)

In other examples other formulas are used to calculate the destination score. Other appropriate pairs of equations that define source and destination scores in terms of each other may be used. For example, in the embodiment depicted in FIG. 19, all links are treated equally. In some embodiments, link weights (e.g., weights assigned based on anchor text) are used to bias the computation of source and/or destination scores. At 1908, nodes that reach nodes that have nonzero destination scores are assigned source scores. One method for calculating source scores is as follows:

$$z(p) = \frac{\beta}{|Out(q)|} \sum_{q \in Out(p)} z(q) + (1-\beta) \frac{d(p)}{r(p)} \quad (12)$$

$$s(p) = \phi s(p) + (1-\phi) z(p)$$

Where:

s(p) is the source score of a page p d(p) is the destination score of a page p r(p) is the unbiased stationary probability of a page p β is a probability, typically set to 0.85

Out(p) is the set of outlinks of a page p

ρ is a value between 0 and 1, inclusive ($0 \leq \rho \leq 1$)

φ is a value between 0 and 1, inclusive ($0 \leq \phi \leq 1$)

In other examples other formulas are used to calculate the source score, as appropriate.

At 1910, nodes reachable from nodes having nonzero source scores are assigned destination scores. As used herein, "evaluation" nodes are nodes which have nonzero source scores, used to evaluate the destination score of a particular web node, or nodes which have nonzero destination scores, used to evaluate the source score of a particular web node. In some cases, evaluation nodes may be used for both purposes. In some embodiments, the process iterates through 1908 and 1910 until convergence. In some cases, such as where collection 102 is large, only a small number of iterations may be needed to achieve useful source and destination scores. In such cases, the process may be terminated before convergence.

Figure 20:
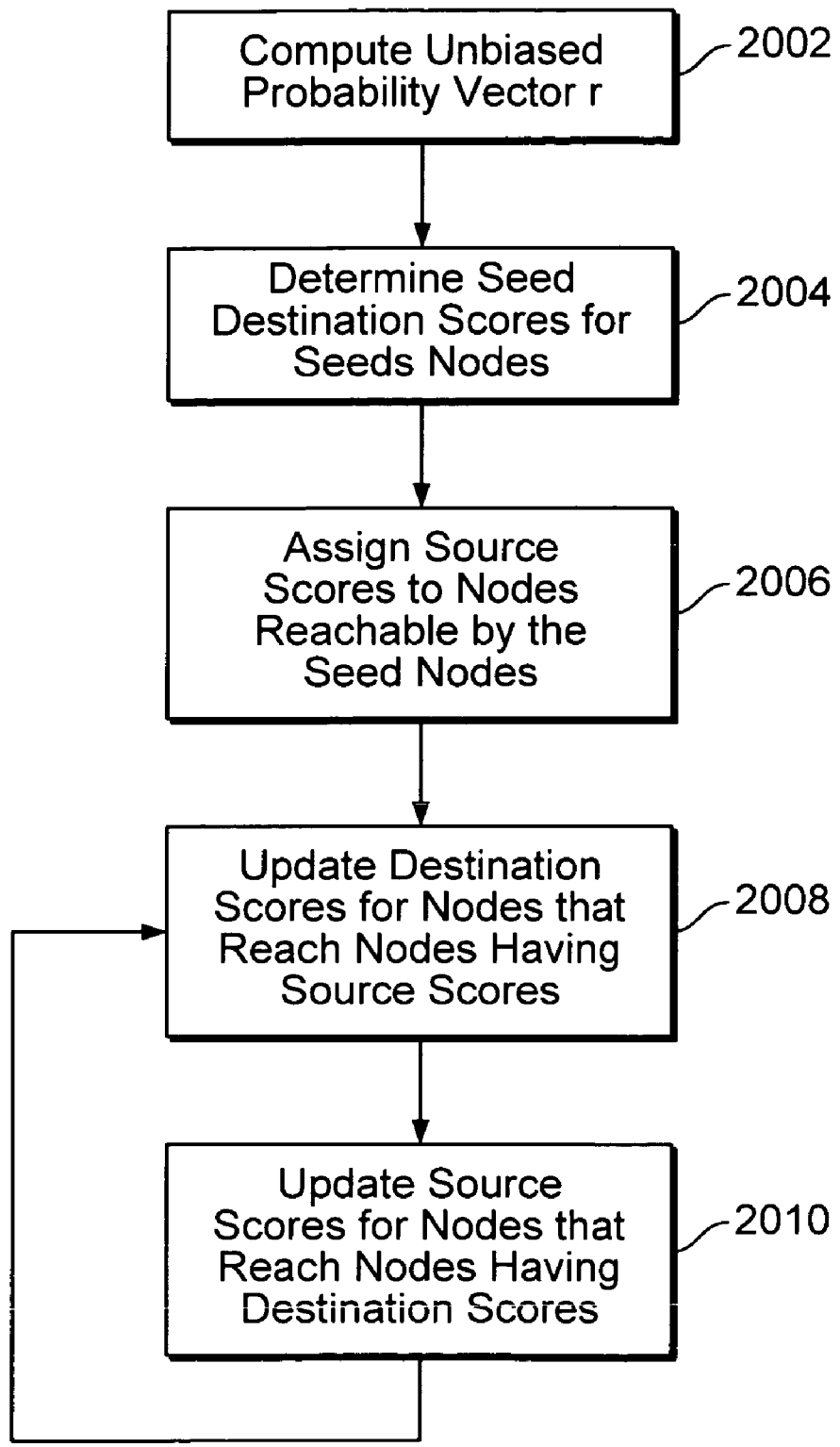
FIG. 20 illustrates an embodiment of a process for assigning scores based on a destination set.

FIG. 20 illustrates an embodiment of a process for assigning scores based on a destination set. The example shown can be used in cases where no known sources for a particular topic exist and the source seed set is empty. In that case, if a good destination or set of destinations is known, the destination set can be used to find a source set. For example, for a particular health topic, such as a rare blood disease, no source seed set may be known. It may nonetheless be known that particular sites are good destinations about the topic. A destination set can be used as appropriate to seed the process.

The process begins at 2002 when an unbiased probability vector r is computed, such as through use of the formula given in Equation 2. At 2004, each seed node in the destination set is assigned a seed destination score. The source and destination scores of the pages in collection 102 are optionally initialized, such as through use of the procedure discussed in conjunction with 1704 of FIG. 17. In this example, the destination vector d is initialized to ρd and the source vector s is initialized to φs. Vectors b and z are initialized to 0.

At 2006, nodes that reach the destination seeds are assigned source scores as applicable. At 2008, nodes that are reached by nodes that have nonzero source scores are assigned destination scores as applicable. At 2010, nodes that reach destinations having nonzero destination scores are assigned source scores as applicable. In some embodiments, the process iterates through 2008 and 2010 until convergence. In some cases, such as where collection 102 is large, only a small number of iterations may be needed to achieve useful source and destination scores. In such cases, the process can be terminated before convergence.

Topic Relevance

Figure 21:
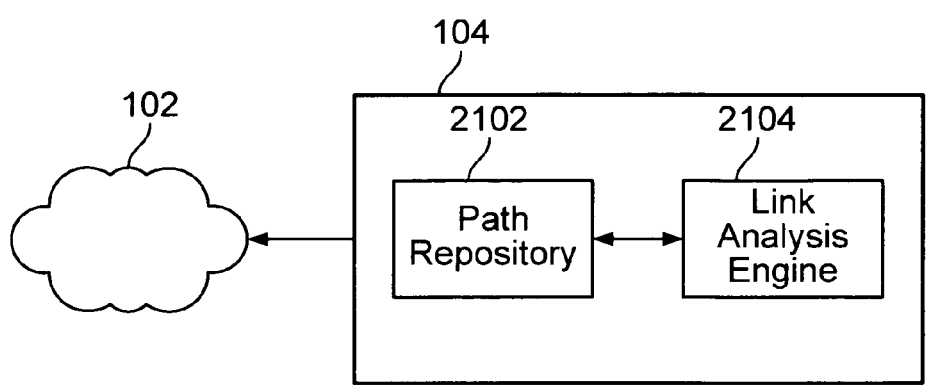
FIG. 21 illustrates an embodiment of a link analysis engine.

FIG. 21 illustrates an embodiment of a link analysis engine. In the example shown, collection 102 is a group of World Wide Web pages, and is crawled and indexed by a search system 104.

At least some of the documents in collection 102 include links to other documents in collection 102. As described in more detail below, the documents in collection 102 can be represented as a directed graph (hereinafter the "web graph"). In this example, the graph has N nodes, where N corresponds to the number of documents in collection 102. The directed connections between nodes represent the links between documents. For a particular page p, Out(p) is the set of outlinks that lead from the page to other pages. These can be represented in the directed graph as forward links of a node p. Similarly, In(p) is the set of inlinks that lead from other pages to page p. These can be represented in the directed graph as the backward links of a node p.

Path repository 2102 contains information associated with the links between the documents in collection 102. For example, in some embodiments, path repository 2102 contains a table detailing the inlinks and outlinks of each page in repository 102. In some embodiments, other methods are used to encode linking information.

Link analysis engine 2104 is used to analyze link information such as is provided by path repository 2102. The information can be used, for example, to determine the relevance of a document to one or more topics (which can be defined, e.g., by another document, or a group of documents, such as a seed set). The information can also be used to assign one or more scores to documents. In some cases, multiple scores are combined into a single score such as by using a weighted average. The scores can be used to rank pages, for example, in response to a search query, based on a variety of functions.

In some embodiments, the information in path repository 2102 includes information supplied, such as by a third party, rather than extracted from collection 102 by a search system 104. In some embodiments, path repository 2102 and link analysis engine 2104 are not part of a search system (e.g., they form a link analysis system) and/or other components of search system 104 are omitted.

Figure 22:
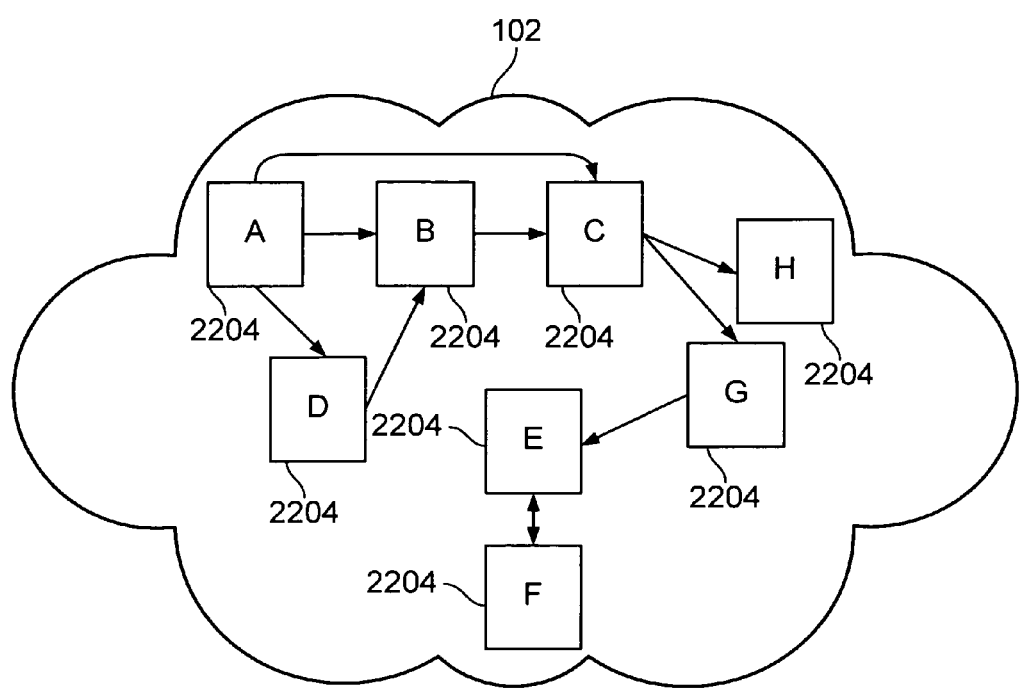
FIG. 22 illustrates sample documents in a collection having link structure.

FIG. 22 illustrates sample documents in a collection having link structure. In the example shown, a collection, such as collection 102 includes several documents 2204. Here, page A has three outlinks—they lead to pages B, D, and C. The direction of the link is indicated here with an arrow head. Page B has two inlinks (from pages A and D) and one outlink (to page C). Pages E and F link to each other. Thus, page E has two inlinks (page G and page F) and one outlink (page F), while page F has one inlink and one outlink (page E in both cases).

Page B is "reachable" from page A in this case because there is a direct link leading from page A to page B. In addition to direct links, however, a page can also be reachable from pages that are not directly linked. In this example, page C is reachable from page D because a person visiting page D could follow an outlink from page D to page B, and then follow another outlink from page B to page C. As discussed more fully below, the reachability of a page can be conceptualized as the probability that a random surfer beginning on a first page will wind up on a second page.

Figure 23A:
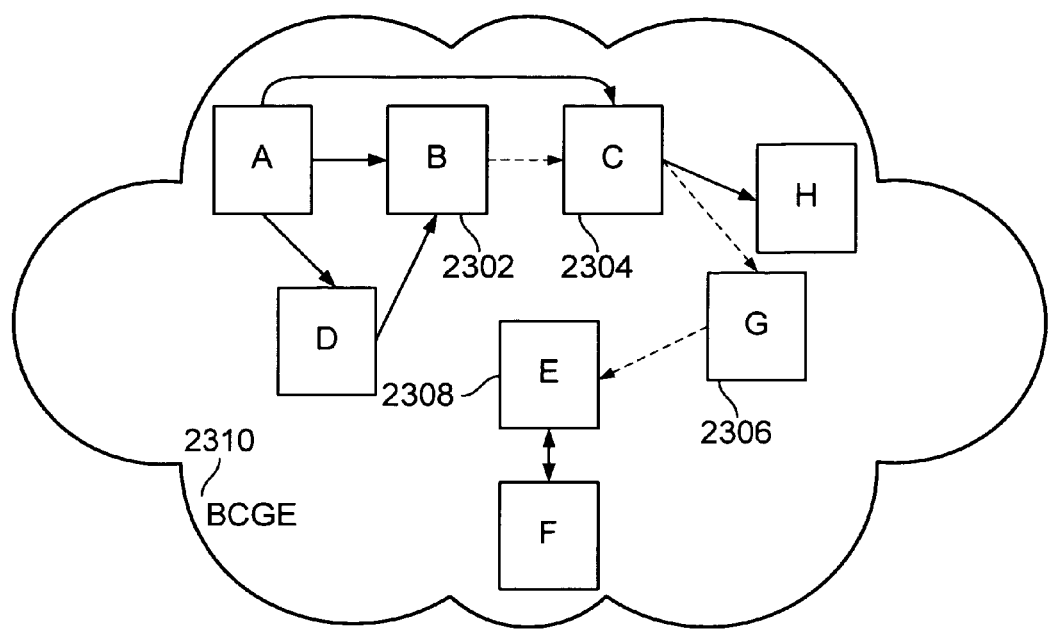
FIG. 23A is an example of a natural random walk.

FIG. 23A is an example of a natural random walk. In a typical random surfer model (also referred to herein as the unbiased model/random walk, performed by an unbiased surfer), a surfer starts at a random page on the web and begins surfing. If the surfer is currently at page p, the page q that the surfer visits at the next time step is determined in the unbiased model as follows: with probability $\beta$, the surfer picks a link uniformly at random from the set of outlinks of p, and follows it to reach a new page; with probability $1-\beta$, the surfer randomly teleports to a page picked uniformly at random from all of the pages on the World Wide Web. The value $\beta$ is typically set to 0.85. The walks that the random surfer performs are referred to herein as "paths." In this example, the generated path indicates that documents could be accessed by following the walk. The walk itself is typically simulated, such as by one or more methods of approximating or modeling the behavior of a random surfer, rather than performing an actual random walk.

For each page p in collection 102, the probability that the unbiased surfer visits p at the current time step converges to a value that depends only on the link structure of the web. This probability is the stationary probability of page p and is referred to herein as the "Page Rank" of page p. The vector r that lists, for each page, its Page Rank is referred to herein as the Page Rank vector r, and can be given as:

$$r = \beta A r + (1-\beta)i)u \qquad (13)$$

Where:
r is the Page Rank vector
$\beta$ is a probability, typically set to 0.85
A is a matrix that encodes the link structure of a collection
u is a vector corresponding to uniform random teleportation
If there are N pages in collection 102, u has N entries, each equal to 1/N.

A random walk R is composed of many "natural random walks" created by breaking the random walk, R, at each teleportation step. Consider the following random walk, R, made up of assorted web pages (denoted by $W_x$, where x is a number between 1 and N, inclusive) and teleports (denoted T):

$R = W_1\ W_8\ W_3\ T\ W_{12}\ W_2\ W_3\ W_{11}\ W_{20}\ W_{31}\ T \ldots$

The natural random walks in R are as follows:

$R_1 = W_1\ W_8\ W_3$
$R_2 = W_{12}\ W_2\ W_3\ W_{11}\ W_{20}\ W_{31}$
. . .

In the example shown in FIG. 23A, a natural random walk (denoted by a dashed line) began at page B (2302), continued to page C (2304), then continued to page G (2306), then continued to page E (2308) before teleporting. Thus, in the example shown in FIG. 23A, the natural random walk was of length 4, notated as path BCGE (2310).

Figure 23B:
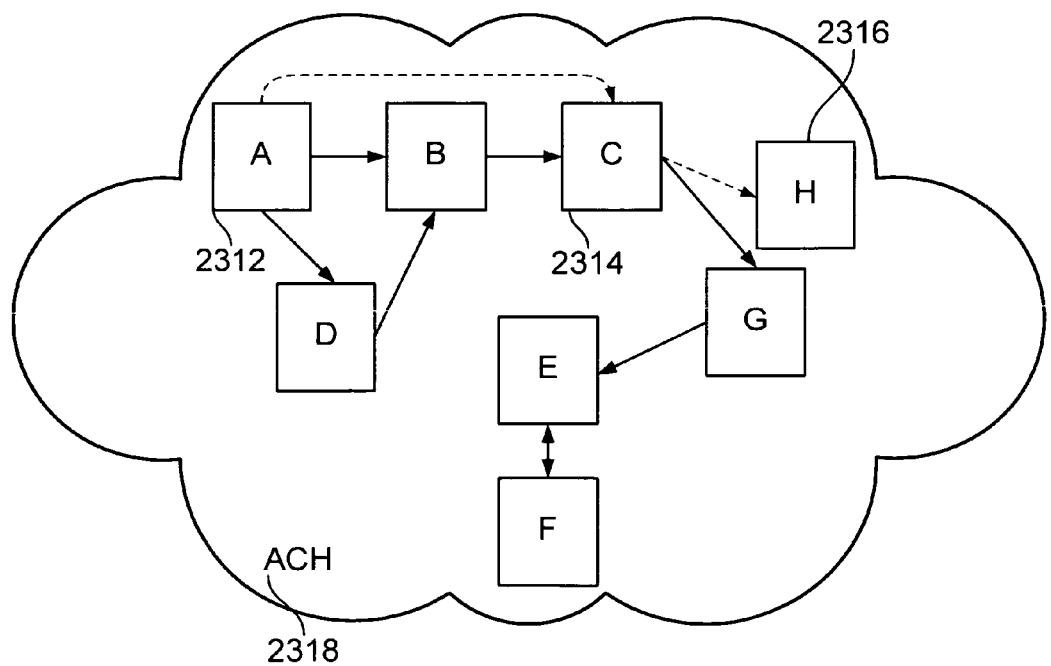
FIG. 23B is an example of a natural random walk.

FIG. 23B is an example of a natural random walk. After teleporting from page E (2308), a new random walk was begun on page A (2312). The walk continued from page A to page C (2314), and then continued to page H (2316) before teleporting. Thus, in the example shown in FIG. 23B, the random walk was of length 3, notated as path ACH (2318).

Market Basket Analysis

As described in more detail below, topic score and topic relevance measure different properties of a page in a topic—popularity and relevance.

The natural random walk framework can be viewed in the context of data mining, in particular market basket analysis. A traditional problem in data mining is determining "association rules" given market baskets.

Assume there is a list of contents of every grocery cart (market basket) that was checked out at a grocery store. This data can be mined to see how some products should be placed in the store. For example, if every purchase of diapers is also accompanied by a purchase of beer, i.e., Diapers→Beer, it may be profitable to locate the beer near the diapers.

Two metrics used in data mining are the confidence (i.e., what is the probability that X→Y) and the support (i.e., how many times do X and Y appear together in the market baskets).

Support can be used to prevent the making of decisions based on very sparse data. For example, if exactly one person purchased vodka, and they bought it with diapers, Vodka→Diapers with confidence 1. However, the support would be very low.

Natural random walks can be seen as market baskets. The topic relevance of a page X in topic F is the Confidence that X→F. The topic score of X is the support. Thus, topic score and topic relevance are fundamentally different metrics. One way to employ both scores is to use support as a threshold and confidence as a final score. In other embodiments, other combinations of the functions are used.

A "distinguished" page is used herein to mean a page that is of interest in determining the relevance of one or more pages to a topic. For example, a highly informative site may be used to define a topic (e.g., medline.com for health, or imdb.com for movies.) As described in more detail below, in some cases, the distinguished page is a member of a group of pages that define a topic. For example, the distinguished page may be part of a seed set of pages, such as the seed sets used in the DIFR process described above.

Figure 24A:
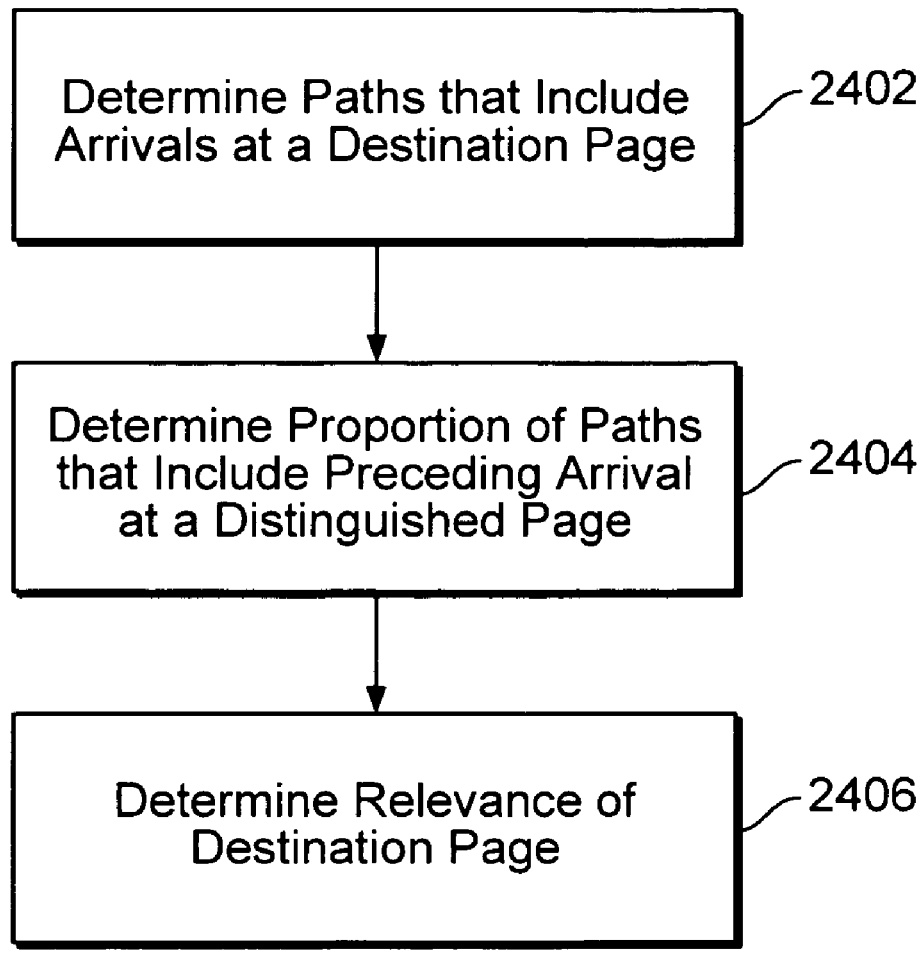
FIG. 24A illustrates an embodiment of a process for determining the relevance of a document.

FIG. 24A illustrates an embodiment of a process for determining the relevance of a document. In this example, the relevance of a destination page to a distinguished node is determined. As described in more detail below, other methods may be used to determine the relevance of one document to multiple documents, and/or to combinations of documents.

This process may be implemented in link analysis engine 2104. In the example shown, the process begins at 2402 when paths that include arrivals at a destination page are determined. A simplified numeric example of an iterative method for determining such paths is given in FIGS. 25A-25D to help illustrate the process conceptually. As described in more detail below, in some embodiments, more efficient processes are employed to implement and/or model the determination of paths.

At 2404, the proportion of paths that include visiting the distinguished page before reaching the destination page is determined. For example, in FIG. 22, if page B is a distinguished node, and page G is a destination node, all paths that lead through page G (e.g., CGE, BCG, GE, ACGE) would be included in the processing at 2402. Only the paths in which page B was visited before page G would be included in determining the proportion at 2404. For example, ABCG and ADBCG visit page G after visiting page B, while CGE does not.

At 2406, the relevance of the destination page is determined. As described in more detail below, various methods of determining the relevance of a destination page may be employed. For example, the relevance of a page to a group of pages may be determined. In some embodiments, relevance is determined by combining multiple values, such as a DIFR score and/or score deta reverse relevance score.

In some embodiments, portions 2404 and 2406 of FIG. 24A are combined—the relevance of a destination page to a distinguished node is determined by assigning a score based on dividing the number of paths that include preceding arrival at a distinguished page by the total number of paths the include arrivals at the destination page. This is the case, for example, in the process depicted in FIGS. 25A-25D and is referred to as a topic score.

Figure 24B:
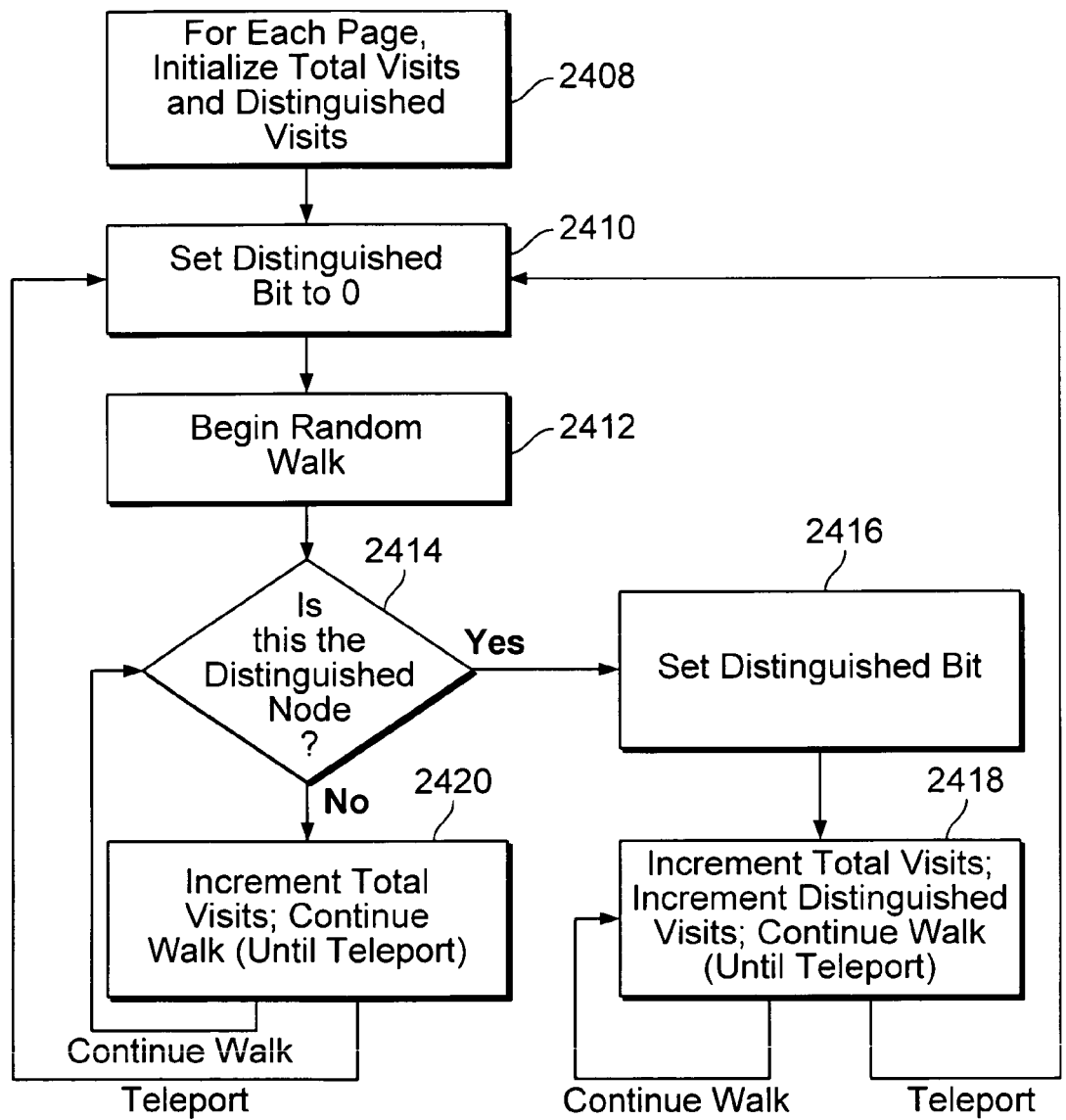
FIG. 24B illustrates a simplified embodiment of a portion of a process for determining the relevance of a document.

FIG. 24B illustrates a simplified embodiment of a portion of a process for determining the relevance of a document. The process depicted in FIG. 24B could be an example of an implementation of portions 2402 and 2404 of FIG. 24A as applied to collection 102.

A topic score for a destination page can be computed by "counting" the number of times that a distinguished page was encountered before the destination page in a series of natural random walks.

In an example random walk, assume each web page has a total visit counter. Each time the random surfer visits the web page, he increments the page's total visit count by 1. Now assume that the random surfer can carry finite state information along while performing random walks. For example, suppose the random surfer carries around the Boolean variable "Visited_F". The value is initially set to 0. When the random surfer visits a page F, the variable is set to 1. When the random surfer teleports, his states (such as the Visited_F variable) are reset to 0. In this example, page F is a distinguished node.

Each web page has one or more additional counters, such as a counter $Count_F$. When the random surfer visits the web page, he updates the page's counters appropriately based on his state information. In some embodiments, rather than having counts increment by the same value (e.g., 1), the increment values are based at least in part on the distance between the distinguished page and the current page.

One method of updating a page's counters is given below in the following pseudocode:

```
/* on visiting Web Page X */
    /* increment the Link Score Counter */
    Total_Visits(X)++;
    /* do distinguished visit logic (F is a distinguished node)
    */
    If (X==F){
        Visited_F=1;
    }
    If (Visited_F){
        CountF(X)++;
    }
/* on teleport */
    Visited_F=0;
```

Based on the above pseudocode, the Page Rank of a web page X can be written as follows:

$$P(X) = \frac{Count(X)}{\sum_{i \in Web} Count(i)} \quad (14)$$

The topic score of page X in the topic F can be written as follows:

$$P_F(X) = \frac{Count_F(X)}{\sum_{i \in Web} Count_F(i)} \quad (15)$$

In the example shown, the process begins at 2408 when, for each document in collection 102, a total visit count and a distinguished visit count are initialized. In this example, a single distinguished page is tracked. As described in more detail below, in some embodiments, multiple pages may be distinguished, and the process is modified accordingly.

One method of initializing the counts is to set both values to 0 for all pages in collection 102. In some embodiments, other methods are used for initialization, such as by setting specific values for particular pages.

At 2410, the distinguished bit, which tracks whether or not a surfer has visited the distinguished node, is set to 0, indicating that the distinguished node has not yet been visited.

At 2412, a random walk is begun. If an encountered page is the distinguished node (2414), at 2416, the distinguished bit is set, for example to 1. Additionally, the total visits counter and the distinguished visits counters of the distinguished page are incremented (2418). The random walk continues and each subsequently encountered page has its total visit counter and distinguished page counter incremented, until teleport occurs. Upon teleport, the random surfer's distinguished bit is reset to 0 (2410) and a new random walk is begun (2412).

During the random walk, until the distinguished node is visited (2414), each visited page has its total number of visits counter incremented (2420), but does not have its distinguished page counter incremented. In this example, the process terminates when convergence is reached (not shown).

The methods presented in conjunction with FIG. 24B are given in part to help conceptualize a process for computing the relevance of a page. While the equations presented can be used to compute relevance, to do so would require, for each page p, a very large number of computations, especially when collection 102 is large. As described more fully below, in some embodiments, more efficient processes are employed to calculate scores.

A simplified numeric example of an iterative version of the process shown in FIG. 24B is given in FIGS. 25A-25D to help illustrate the process conceptually. For simplicity of illustration, the values given in FIGS. 25A-25D are not normalized to maintain unity.

Figure 25A:
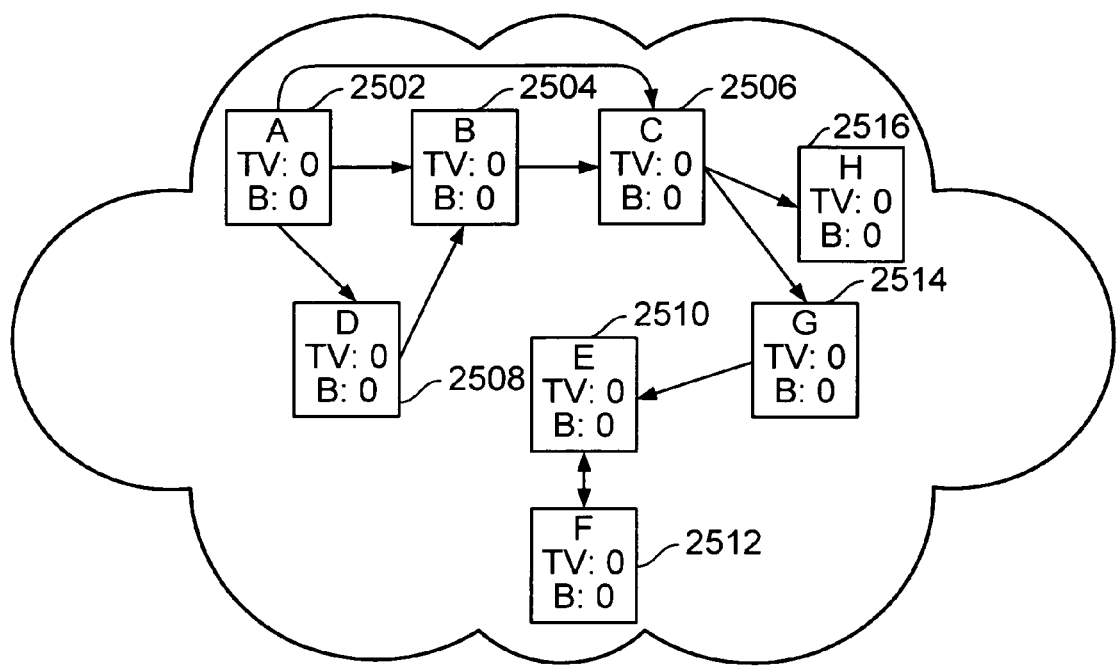
FIG. 25A illustrates a simplified embodiment of a portion of a process for assigning scores to a collection of documents.

FIG. 25A illustrates a simplified embodiment of a portion of a process for assigning scores to a collection of documents. The process depicted in FIG. 25A could be an example of an implementation of portion 2408 of FIG. 24B as applied to collection 102. In the example shown, nodes A-H (2502-2516) are included in collection 102. Node B is a distinguished node. Their total visit counts (represented here as "TV"), and their visits that were preceded by a visit to the distinguished node (represented here as "B") are initialized to 0.

Figure 25B:
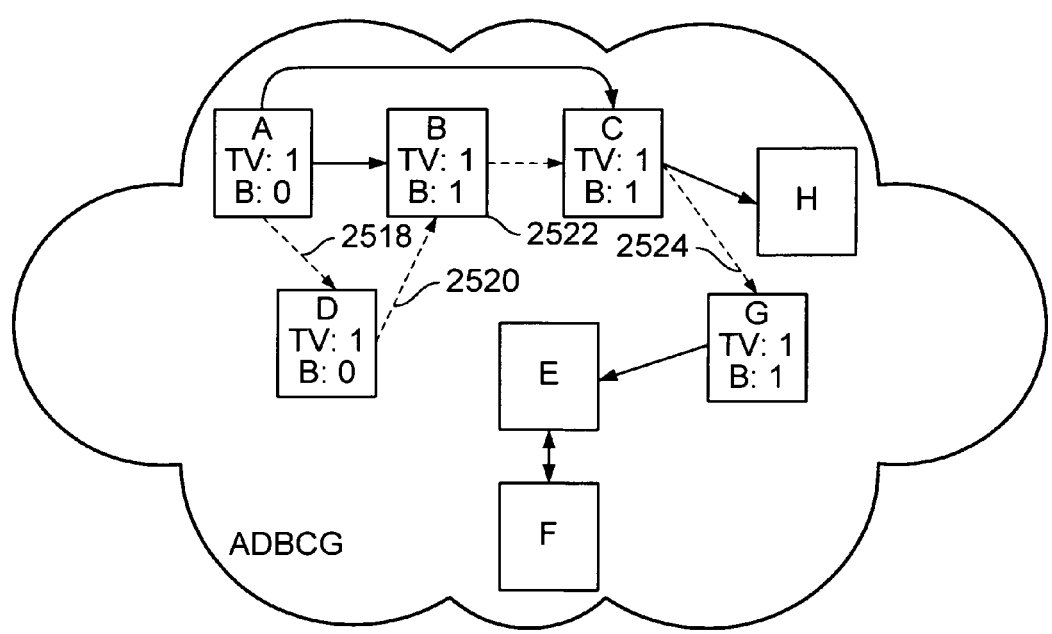
FIG. 25B illustrates a simplified embodiment of a portion of a process for assigning scores to a collection of documents.

FIG. 25B illustrates a simplified embodiment of a portion of a process for assigning scores to a collection of documents. The process depicted in FIG. 25B could be an example of an implementation of portions 2410-2418 of FIG. 24B. The distinguished bit is set to 0 (not shown). A random walk beginning at node A is performed (represented herein as a dashed line). Since node A is not the distinguished node, only its total visit counter is incremented. The second page in the random walk is node D (2518). Node D's total visit count is incremented, but its B count is not, because the random surfer has not yet visited node B. The third page in the walk is node B, the distinguished node (2520). Both of node B's counters are incremented. The fourth page visited in the walk is node C (2522). Both of node C's counters are incremented. The fifth page visited in the walk is node G (2524). Both of node G's counters are incremented.

Figure 25C:
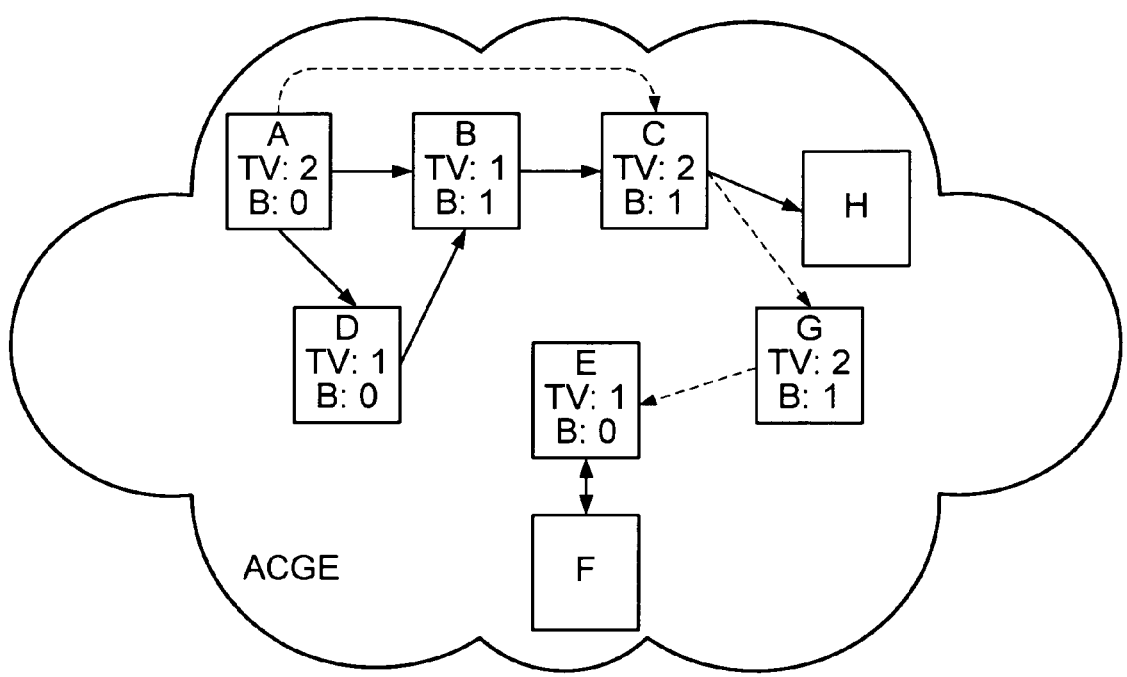
FIG. 25C illustrates a simplified embodiment of a portion of a process for assigning scores to a collection of documents.

FIG. 25C illustrates a simplified embodiment of a portion of a process for assigning scores to a collection of documents. The process depicted in FIG. 25C could be an example of an implementation of portions 2410-2418 of FIG. 24C. After teleporting, the distinguished bit is again set to 0 (not shown). In the random walk shown, the distinguished page, node B, is not encountered before teleport. Thus, each visited page has its total visit counter incremented, but not its B counter.

Figure 25D:
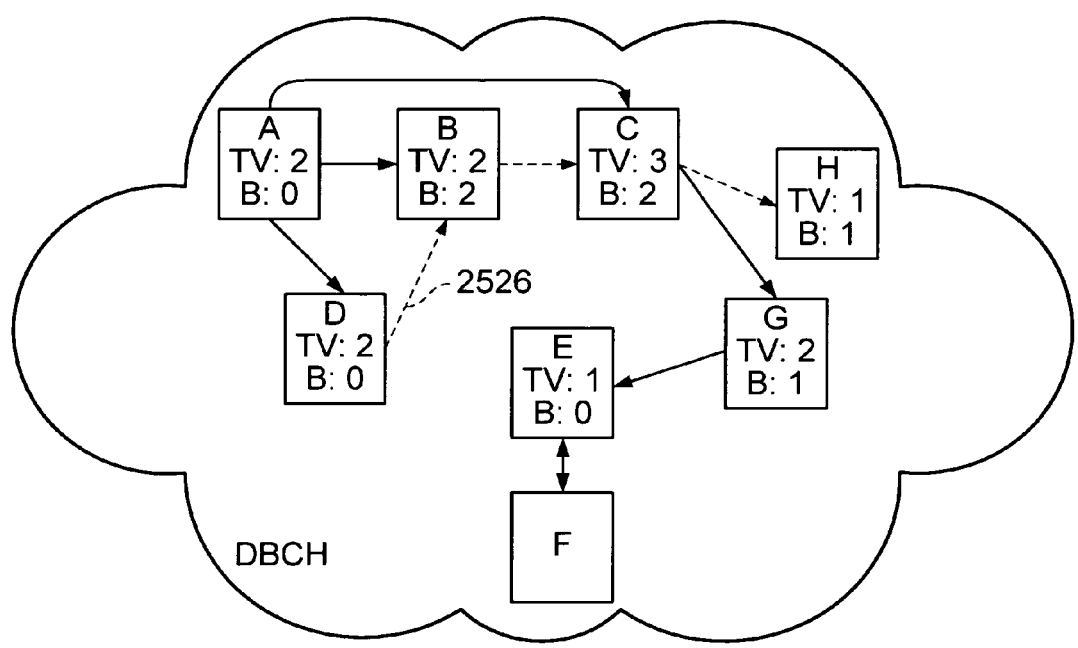
FIG. 25D illustrates a simplified embodiment of a portion of a process for assigning scores to a collection of documents.

FIG. 25D illustrates a simplified embodiment of a portion of a process for assigning scores to a collection of documents. The process depicted in FIG. 25D could be an example of an implementation of portions 2410-2418 of FIG. 24C. After teleporting, the distinguished bit is again set to 0 (not shown). In the random walk shown (this time beginning at node D), page B is encountered as the second page in the walk (2526). Thus, node D has only its total visit counter incremented, while nodes B, C, and H have both counters incremented.

After the processing of FIG. 25D, the following basic relevance has been determined. Node A has a relevance score is 0, or 0 divided by 2. The same holds true for Node D, which has the same score. Node B has a relevance score is 1 (2 divided by 2). Node C has a relevance score of 0.666, or 2 divided by 3. The scores of the other nodes in FIG. 25D can be similarly computed. These scores indicate the percentage of traffic (in the sense of number of visits, not kilobytes) that each node received via node B.

Typically, if one page links to another, it indicates that there is something in common between the two pages. For example, a page containing general information about the sport of football may link to team sites. Similarly, a team page may link to ticket sales, to local information about the city in which the team resides, or to television schedules. However, in some cases, the only commonality between pages in the same natural random walk is that they are in close proximity to each other.

For example, a page containing a salad recipe may link to the restaurant in which the page author first tried such a salad. The restaurant page may in turn link to the page of an artist, whose works are displayed on the restaurant walls. It is possible that a fairly large amount of traffic may flow from the salad recipe page to the artist's page, for example, if the recipe site is well known. Nonetheless, the two pages, one for a salad recipe, and one for a portrait painter, have effectively little to do with each other.

In a random walk R, consider a page X that appears often after F and so has a high topic score. Page X can also appear often, in general, whether or not F precedes it. Page X may thus have little to do with F, outside of the fact that it is "close" to F. A topic score is thus a measure of proximity to F and popularity, not necessarily the relevance to the topic.

For the same two pages X and F, a question can be asked: What is the confidence that X→F? If X appears in a natural random walk, what is the probability that it is preceded by F? If this probability, P(X→F), is large, F appears most of the time X appears. Page X can be seen as a captive of F—since it can only be reached through F, its only purpose is to serve F, and so it must be highly relevant to F. Based on the standard random surfer:

$$P(X \to F) = \frac{\text{Count}_F(X)}{\text{Count}(X)} \qquad (16)$$

The ratio of the topic score of X in F to the link score of X can be referred to as $\Delta_F(X)$. The relevance of a page X to a topic F, denoted by $\text{Rel}_F(X)$ can be given as:

$$\text{Rel}_F(X) = P(X \to F) = \frac{\Delta_F(X)}{\Delta_F(F)} \qquad (17)$$

The above formulation is independent of the teleportation probability, the memoryless nature of the random walk, etc.

If the natural random walks are viewed as a collection of strings, the result above holds for any collection of strings. The set of strings that can appear as natural random walks is the same as those accepted by the web graph viewed as a finite state automaton (FSA) constructed as follows: Add a new node T that represents teleport to the web graph FSA. Node T has edges to and from every other node in the web graph.

Here, every edge is labeled with the destination page's symbol. Thus edge (x,y) has the label y. Node T is the start state and also the success state. The set of strings accepted by this FSA is identical to the set of strings that are the natural random walks on the web graph. In some embodiments, the Markovian world is used to model the frequency of occurrence.

Topic relevance is a probability measure and so has a value between 0 and 1. Thus it should be the case that for all X, $\Delta_F(F) \geq A_F(X)$.

Consider a topic defined by page F, and a given page X, where X is different from F. As determined previously, $$\Delta_F(X) = \frac{P_F(X)}{P(X)}.$$

The Page Rank of X can be defined in terms of X's neighbors:

$$P(X) = \beta \times \sum_{Y \text{ neighbor of } X} \frac{P(Y)}{O(Y)} + \frac{(1-\beta)}{N} \quad (18)$$

Where $1-\beta$ is the teleport probability, O(Y) is the number of outlinks of Y, and N is the number of pages in the web graph. In some embodiments, if the Page Rank of X is much larger than the incoming teleportation probability (a fixed number), the contribution of teleportation can be ignored and the equation can be rewritten as:

$$P(X) = \beta \times \sum_{Y \text{ neighbor of } X} \frac{P(Y)}{O(Y)} \quad (19)$$

Consider now the topic rank of X. Since the random walks are memoryless, the topic rank of X in both cases is the same, if the topic is defined as a single page, as is the case in this example. Given that X is different from F, there is no teleportation to X in the topic definition, thus:

$$P_F(X) = \beta \times \sum_{Y \text{ neighbor of } X} \frac{P_F(Y)}{O(Y)} \quad (20)$$

Now:

$$\Delta_F(X) = \frac{\sum_{Y \text{ neighbor of } X} \frac{P_F(Y)}{O(Y)}}{\sum_{Y \text{ neighbor of } X} \frac{P(Y)}{O(Y)}} \quad (21)$$

The "Effective Page Rank" of a page Y, denoted as Q(Y), can be defined as:

$$Q(Y) = \frac{P(Y)}{O(Y)} \quad (22)$$

Now, $$\Delta_F(X) = \sum_{Y \text{ neighbor of } X} \frac{Q(Y)}{\sum_{Z \text{ neighbor of } X} Q(Z)} \times \Delta_F(Y) \quad (23)$$

Thus, $\Delta_F(X)$ is the weighted-average of the deltas of all X's neighbors, where the weights are the effective Page Ranks of the neighbors.

A Web Page with a high effective Page Rank is generally more influential in propagating its delta than a page with a low effective Page Rank. Thus, in some embodiments, the seed set includes pages with a high effective Page Rank.

Topic drift can happen when a page with high effective Page Rank and low delta links to a page with a high topic rank. High effective Page Rank pages are topic arbiters, diffusing deltas through the Web Graph.

Topics can be defined using multiple web pages. For simplicity, consider a Topic "F+G" defined by two web pages F and G. Using the natural random walk framework, the topic rank of any page X in this topic F+G is the average of the topic rank of X in F and X in G.

In some embodiments, topics are defined as a property of the general random walk on the web graph, not by defining a new random walk. The notion of topic relevance is one outcome of taking this approach.

For single-page topics, the two approaches end up being the same. This is not the case for multi-page Topics.

First, consider the logic the random surfer adopts for multi-page Topics. For simplicity, assume a two-page Topic defined by pages F and G. The following pseudocode describes the rules that govern the random surfer:

```
/* do distinguished visit logic */
If ((X==F)||(X==G)){
    Visited_FG=1;
}
If (Visited_FG){
    Count_FG(X)++;
}
/* increment the Page Rank Counter */
Count(X)++;
/* on teleport */
Visited_F=0;
```

A topic rank of a page X in topic F+G can be given as:

$$P_{FG}(X) = \frac{\text{Count}_{FG}(X)}{\sum_{J \in Web} \text{Count}_{FG}(J)} \quad (24)$$

Assume that F and G are mutually exclusive (i.e., G never shows up in a natural random walk with F). This can be written as $P_F(G)=P_G(F)=0$. In this case:

$$P_{FG}(X) = \frac{\text{Count}_F(X) + \text{Count}_G(X)}{\sum_{J \in Web} \text{Count}_F(J)} + \sum_{J \in Web} \text{Count}_G J \quad (25)$$

It can be shown that:

$$\frac{\sum_{J \in Web} \text{Count}_F(J)}{\sum_{J \in Web} \text{Count}_G(J)} = \frac{\Delta_G(G)}{\Delta_F(F)} \quad (26)$$

The inverse of Δ is denoted here by Δ*. That is, $$\Delta_F^*(F) = \frac{1}{\Delta_F(F)}.$$

Based on the above equations, $$P_{FG}(X) = \frac{\Delta_F^*(F)}{\Delta_F^*(F) + \Delta_G^*(G)} \times P_F(X) + \frac{\Delta_G^*(G)}{\Delta_F^*(F) + \Delta_G^*(G)} \times P_G(X) \quad (27)$$

In some embodiments, in a multi-page topic, if it is assumed the pages defining the topics are mutually exclusive in the natural random walks, then the topic rank is the weighted average of the topic rank in the corresponding single-page topics. The weights are the corresponding Δ*s.

The weights for each single-page topic score can be based on its corresponding Δ* for it to correspond to a property of the original Random Walk.

If the pages that define the topic are not mutually exclusive, the computation is made more complex. The natural random walks in which F and G both occur will be double counted if the above analysis is used.

Assume F, G, and X, occur exactly once in a natural random walk. It can be shown that the average number of occurrences of any page Y in a natural random walk, given that Y appears at least once, is given by:

$$\frac{P_Y(Y)}{(1-\beta)}.$$

In some embodiments, the X's that are double-counted are backed out. Page X will be double counted where there is both an F and a G preceding the X. The number of X's in the F→G→X sequence is given by: $Count_A(B) \times P_B(X)$. Similarly, for G→F→X.

For the denominator, sequences of the form F→G→T (teleport) are double counted. Every page in the sub-sequence G→T is double counted. Given that G has occurred, the average number of web pages in G→T is $$\frac{1}{(1-\beta)}.$$

This is similar for sequences of the form G T.

$P_{FG}(X)$ can be written as follows:

$$P_{FG}(X) = \frac{\Delta_F^*(F) \times P_F(X) + \Delta_G^*(G) \times P_G(X) - \Delta_F^*(F) \times P_F(G) \times P_G(X) - \Delta_G^*(G) \times P_G(F) \times P_F(X)}{\Delta_F^*(F) + \Delta_G^*(G) - \frac{\Delta_F^*(F) \times P_F(G)}{(1-\beta)} - \frac{\Delta_G^*(G) \times P_G(F)}{(1-\beta)}} \quad (28)$$

Given a web page X, for all possible topics F, give the confidence and support that X belongs to F. In this example, assume that topics are defined by a single web page. For example, consider only those natural random walks where X appears. One way to find the set of pages F that consistently precede X in these natural random walks is to first focus on topic relevance. If when X appears in a natural random walk it is preceded by F with high probability, then X→F. Now, given X, what are the Fs that precede it with high probability?

One way to solve this problem is to create a dual web graph. The nodes of the dual web graph are the web pages, just like in the original web page. However, the directionality of all links in the original web graph are inverted. Thus all inlinks in the original web graph are now outlinks in the dual web graph and vice versa. The random walk on this dual web graph can be denoted by $R^D$.

One property satisfied by $R^D$ is that every natural random walk that appears in R appears reversed in $R^D$, and the same number of times. $R^D$ preserves Page Rank. This property in Markov Chains is called "reversibility". If the natural random walks are strings, in the dual, all of the strings are reversed. R and $R^D$ are said to be reversible, if and only if:

$$P(j) \times \pi(j,k) = P^D(k) \times \pi^D(k,j) \quad (29)$$

Here, P(j) is the Page Rank of j, $P^D(k)$ is the Page Rank of k in the Dual Web Graph, and π(j,k) is the probability that edge (j,k) is followed. When R and $R^D$ are reversible, by definition $P^D(k)=P(k)$. Thus:

$$P(j) \times \pi(j,k) = P(k) \times \pi^D(k,j) \quad (30)$$

The transition probabilities in the dual web graph, $\pi^D(k,j)$ can be defined as follows:

$$\pi^D(k,j) = \frac{\beta \times P(j)}{O(j) \times P(k)} \quad (31)$$

where O(j) is the number of outlinks of j. All the outbound probabilities (including teleportation) from a page sum to 1:

$$\sum_{l \text{ neighbor of } k} \pi_D(k,l) + T_O^D(k) = 1 \quad (32)$$

Here, $T_O^D(k)$ is the probability of teleportation out of k in the dual web graph. Teleportation is defined differently in the dual web graph:

$$T_O^D(k) = \frac{(1-\beta)}{(N \times P(k))} \quad (33)$$

Teleportation is more likely out of lower Page Rank nodes in $R^D$. If all pages have equi-probability $$\frac{1}{N},$$

then the outbound teleportation probability becomes what is seen in the standard Page Rank algorithm.

To determine $T_I^D(k)$, the teleportation probability into page k. consider P(k) in the dual web graph:

$$P(k) = \sum_{l \text{ neighbor of } k} P(l) \times \pi^D(l,k) + T_I^D(k) \quad (34)$$

Substituting for $\pi^D(l,k)$:

$$T_I^D(k) = (1-\beta) \times P(k) \quad (35)$$

Teleportation in the dual web graph thus behaves as follows: teleport occurs out of any page k with probability:

$$\frac{(1-\beta)}{(N \times P(k))}.$$

Once teleportation out occurs, teleportation into any page j on the web can occur with probability proportional to its Page Rank P(j). The probability of teleport, across all pages, just as with the original web graph is (1β).

FIG. 26 is a table illustrating properties of walks. Assuming the probability of teleport into any page is proportional to its Page Rank, the desired incoming teleport probability for the page can be obtained.

Given a page X, for every possible topic (e.g., page) F on the web, what is $P_F(X)$ and $Rel_F(X)$? Given a topic page F, the topic rank and the topic relevance for every Page can be computed based on this topic F.

Given any page X, it is possible to find its topic score and topic relevance for every possible topic F. Consider A, an N×N matrix, where $A[j,k]=Rel_k(j)$. Here, topics (as defined by web pages) are the columns and web pages are the rows. The diagonal of this matrix is 1 (since $Rel_k(k)=1$). A is an N×N matrix since in this example every web page also defines a topic. The dual random walk can be used to determine the values of all elements in a given row of the matrix.

For the analysis below, assume that no page appears more than once in any natural random walk. Example identities between the regular random walk and the dual random walk follow. $P(X)=P^D(X)$ (Page Rank is conserved). Thus, Count$(X)=$Count$^D(X)$. By reversing strings the number of times any symbol appears does not change.

The number of regular natural random walks in which F appears followed by X is the same as the number of dual natural random walks in which X appears followed by F. Further, since no page appears more than once in a natural random walk (regular or dual): Count$_F(X)=$Count$_X^D(F)$.

Example: Consider the Natural Random Walks (strings): FCX, XF, CD. Here, the Dual Random Walks are the reverse: XCF, FX, DC. Now, Count$_F(X)=1$ (only in string FCX does F precede X). And, Count$_X^D(F)=1$ (only in string XCF does X precede F).

Consider now the identity: Count$_F(X)=$Count$_X^D(F)$;

$$\frac{\text{Count}_F(X)}{\text{Count}(X)} = \frac{\text{Count}_X^D(F)}{\text{Count}^D(X)}.$$

$$\text{Thus, } Rel_F(X) = \frac{\text{Count}_X^D(F)}{\sum_{i \in Web} \text{Count}_x(i)} \times \frac{\sum_{i \in Web} \text{Count}_x(i)}{\text{Count}^D(X)}.$$

Since Count® $(X)=$Count$_X^D(X)$, $$Rel_F(X) = \frac{P_X^D(F)}{P_X^D(X)} \quad (36)$$

The topic relevance of X in topic F is proportional to the topic rank of F in topic X in the dual web graph. One way of computing the topic relevance of X in every topic on the web is as follows: First, construct the dual web graph as given in the previous section. Next, select web page X as the topic. Next, compute the topic ranks of every web page for topic X in the dual web graph using the standard method of computing topic ranks. Finally, apply the formula above to get the topic relevance of X in every topic.

Now, consider the Dual Web Graph, and consider in particular: $Rel_F^D(X)$. In some embodiments, the above formula is used, noting that the dual of the dual web graph is the regular web graph. Thus:

$$\frac{P_X(F)}{P_X(X)} = Rel_F^D(X) \quad (37)$$

The topic rank of X in all topics F can thus be computed by computing the topic relevance of F in topic X in the dual web graph.

Figure 27:
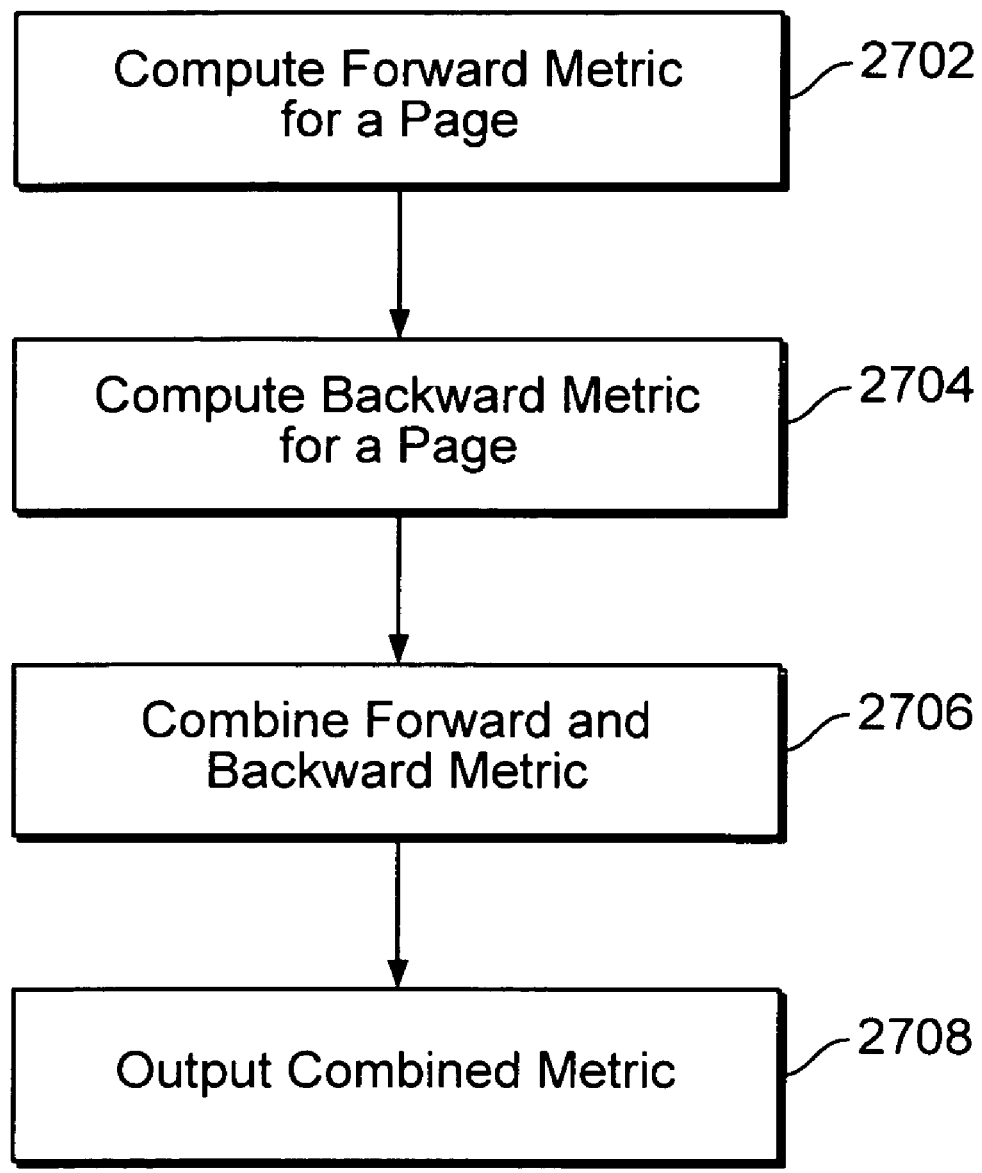
FIG. 27 is illustrates an embodiment of a process for scoring a document.

FIG. 27 is illustrates an embodiment of a process for scoring a document. The process may be implemented in link analysis engine 2104. The process begins at 2702 when a forward metric, such as the topic relevance of F in topic X is computed in usual manner. At 2704, the metric is computed in the dual graph. At 2706, the forward and backward metrics are combined. The metrics may be combined in a variety of ways. For example, a product of the metrics may be taken. The metrics may also be weighted—for example, with the forward metric weighted more than the backward metric. The process ends at 2708 when the combined metrics are outputted, for example, into a relation.

Consider creating an Oakland Raiders topic. The Oakland Raiders website appears like the right page to use to define this topic. Unfortunately, the site is not much of a hub page—it has few outlinks and is more of an "authority" page—one that hubs point to.

In general, a Web Page has both Hub and Authority components. In the formulations above, topic computations are hub-based. However, authority web pages can also be used.

Given a Web Page F that defines the Topic, and any page X, an authority topic rank ($P_F^A(X)$) and authority topic relevance ($Rel_F^A(X)$) can be defined as follows. Here, the superscript A and H to refer to Authority and Hub variants respectively. A topic notation without a superscript is assumed to involve hubs:

$$P_F^A(X)=Rel_X^H(F)=Rel_X(F) \quad (38)$$

$$Rel_F^A(X)=P_X^H(F)=Px(F) \quad (39)$$

Consider the topic web page F and the random surfer. Assume the random surfer has a Visited_j variable for every web page J. If for any web page X, Count$_X(F)$ (the number of visits to F that were preceded by a visit to X), is a significant fraction of Count(F) (the total number of visits to F), X is a significant source of traffic to F. This is a popularity metric—while X may account for a lot of F's traffic, X may just be a general high-traffic site and may not be particularly relevant to F. A measure of topic relevance is needed: if a random surfer visits X, with high probability he visits F, which is given by the hub topic rank of F in X.

In some embodiments, the authority topic rank and relevance of any page X for a given topic F are the same (within a constant factor) as the hub topic rank and relevance of the page X in topic F in the dual web graph. The constant factor can be derived by approximating $P_X(X)$ by $(1-\beta)$—the probability of teleport.

When there is a page for which a topic is to be computed, both hub and authority topics can be computed and the scores combined appropriately when search results are ranked.

Topic relevance can be computed with respect to seed sets of any size. Instead of stating the definition of topic relevance in terms of a single random walker, a large collection of random walkers can be employed.

Suppose a web graph has N nodes. Hypothetical random surfers pursue random walks on the web with a teleport parameter $\beta$ (i.e., the probability of teleport at each step is $1-\beta$). Suppose that the number M of such random walkers is very large, i.e., M>>N and the random walks have settled to equilibrium distributions.

The Page Rank of a page p is the fraction of the total number of random walkers that are on p at any point in time. Using r to denote the Page Rank vector, and r(p) to denote the Page Rank of page p, suppose the number of random surfers at page p is M(p). Then, $$r(p) = \frac{M(p)}{M} \tag{40}$$

Now suppose a set S of seed pages is selected for a topic. In some embodiments, each random surfer is in one of two states: relevant and irrelevant. Here, each surfer is initially in the irrelevant state. When a surfer visits a seed set page, his state changes to relevant (independent of his prior state). These surfers are referred to herein as relevant surfers. When a surfer teleports at random, his state changes to irrelevant. These surfers are referred to herein as irrelevant surfers.

At any time t, the number of relevant surfers at node p can be denoted as $M_R(p)$. The relevance of p is the fraction of the surfers at p who are relevant. The relevance vector is denoted x and the relevance of p is denoted x(p). Then:

$$x(p) = \frac{M_R(p)}{M(p)} \tag{41}$$

If $p \in S$, then $M_R(p) = M(p)$, and so $x(p) = 1$.

Of these random surfers, let M'(p) denote the number that got to b by following a link (i.e., those that did not teleport directly to p). The non-teleport Page Rank (NTPR) of p, denoted r'(p) can be defined as:

$$r'(p) = \frac{M'(p)}{M} \tag{42}$$

Figure 28:
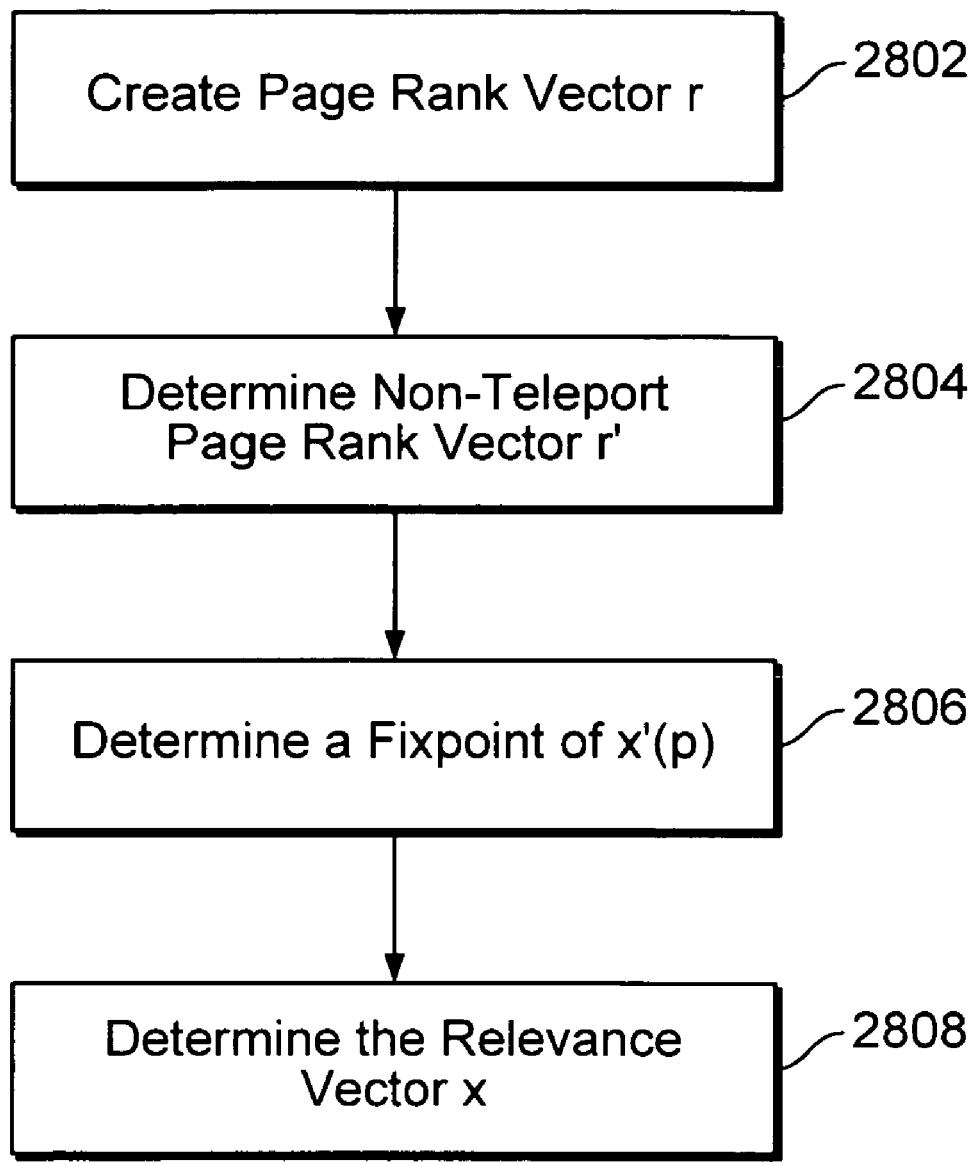
FIG. 28 illustrates an embodiment of a process for determining a relevance vector.

FIG. 28 illustrates an embodiment of a process for determining a relevance vector. This process may be implemented in link analysis engine 2104. In the example shown, the process begins at 802 when a typical Page Rank vector r is determined.

At 2804, a non-teleport Page Rank vector r' is determined. There is a relationship between r and r'. Since there are M random surfers, at any time step $(1-\beta)M$ teleport. Since the teleports are uniformly at random, the number of surfers who teleport into p at any time step is $$(1-\beta)\frac{M}{N}.$$

Therefore:

$$M'(p) = M(p) - \frac{1-\beta}{N}M \tag{43}$$

And thus, the following is one way of determining the NTTP:

$$r'(p) = r(p) - \frac{1-\beta}{N} \tag{44}$$

The non-teleport topic relevance (NTTR) of p, denoted by x'(p) can be defined as follows:

$$x'(p) = \frac{M_R(p)}{M'(p)} \tag{45}$$

In this example, if $p \in S$. $M_R(p) = M(p) > M'(p)$, and so $x'(p) > 1$. The following formula relates x(p) and x'(p):

$$x'(p) = \frac{M_R(p)}{M'(p)} \tag{46}$$
$$= \frac{M_R(p)}{M(p) - \frac{1-\beta}{N}M}$$

This can be simplified, noting that $$\frac{M}{M(p)} = \frac{1}{r(p)},$$

as follows:

$$x(p) = \left(1 - \frac{1-\beta}{Nr(p)}\right)x'(p) \tag{47}$$

A recursive formula can be derived that relates the NTTR of a node to that of its neighbors. This formula can be used as the basis of a graph computation for NTTR.

Consider the relevant surfers at page $p \in S$ at time t+1. The number of surfers at p is M(p), and the number of relevant surfers is $M_R(p) = x'(p)M'(p)$. The in-neighbors and out-neighbors of p can be denoted I(p) and O(p), respectively. In this example, each of these surfers came from an in-neighbor of p. Suppose $q \in I(p)$. At time t, the number of random surfers at q is M(q), and the number of relevant random surfers is $M_R(q) = x'(q)M'(q)$. Of these relevant surfers, a fraction $\beta$ follows outlinks and a fraction $1-\beta$ teleports out of q. The number of relevant surfers from q that land up at p at time t+1 is therefore $$\frac{\beta}{|O(q)|}M_R(q) = \frac{\beta}{|O(q)|}x'(q)M'(q).$$

Thus, at equilibrium:

$$x'(p)M'(p) = \sum_{q \in I(p)} \frac{\beta}{|O(q)|}x'(q)M'(q) \tag{48}$$

Dividing through by M, and using $$r'(p) = \frac{M'(p)}{M},$$

this can be rewritten as:

$$x'(p)r'(p) = \sum_{q \in I(p)} \frac{\beta}{|O(q)|} x'(q)r'(q) \quad (49)$$

It was previously assumed that p∈S. If p∈S, then x(p) is 1. Thus, the following recursive formula for x'(p) can be given:

$$x'(p) = \begin{cases} \dfrac{1}{1 - \dfrac{1-\beta}{Nr(p)}} & \text{if } p \in S \\ \dfrac{1}{r'(p)} \sum_{q \in I(p)} \dfrac{\beta}{|O(q)|} x'(q)r'(q) & \text{if } p \notin S \end{cases} \quad (50)$$

At 2806, a link-based graph computation is used to compute a fixpoint for the recursive equation given above. In some embodiments, pages in the set S are initialized to non-zero values, and the other nodes are initialized to 0.

At 808, the relevance vector x is computed, for example, using $$x(p) = \left(1 - \frac{1-\beta}{Nr(p)}\right) x'(p)$$

as described above.

A matrix equation for NTTR can be used. Define an N×N matrix R and N×1 vector $x_0'$ as follows:

$$R_{pq} = \begin{cases} \dfrac{\beta}{|O(q)|} \dfrac{r'(q)}{r'(p)} & \text{if } p \in S \text{ and } q \in I(p) \\ 0 & \text{otherwise} \end{cases} \quad (51)$$

$$x_0'(p) = \begin{cases} \dfrac{1}{1 - \dfrac{1-\beta}{Nr(p)}} & \text{if } p \in S \\ 0 & \text{otherwise} \end{cases}$$

The recursive formula previously given (Eq. 14) can be rewritten as the following linear matrix equation (a Sylvester Equation):

$$x' = Rx' + x_0' \quad (52)$$

In this example, the matrix R is not stochastic, unlike the corresponding matrix A in the Page Rank equation. Correspondingly, relevance vector x' is also not a probability vector.

Multiple topics can be organized into a topic hierarchy. For example, a topic hierarchy can be implemented in a tree or a DAG, with the children of a node (e.g., football, basketball), being subtopics of the parent (e.g., sports). As described in more detail below, the relevance of each page with respect to each topic in the hierarchy can be computed.

"Children's health" is an example subtopic of "health." Consider a search, such as "music," in the context of children's health. In some cases, high on the results list might be pages about music as it relates to general health. This is because pages that are relevant to general health may also obtain good relevance scores for children's health, due to topic drift.

Hierarchical topic relevance can be used to minimize topic drift by taking advantage of information encoded in the topic hierarchy.

Suppose a web graph has N nodes and there are a large number of random surfers pursuing random walks on the web, with teleport parameter β (i.e., probability of teleport at each step is 1−β). Suppose that the number M of such random walkers is very large, i.e., M>>N, and the random walks have settled to equilibrium.

The typical Page Rank of a page p is the fraction of the total number of random walkers that are on p at any point in time. Using r to denote the Page Rank vector, and r(p) to denote the Page Rank of page p, suppose the number of random surfers at page p is M(p). Then:

$$r(p) = \frac{M(p)}{M} \quad (53)$$

Suppose there is a topic hierarchy H, organized as a tree or as a DAG. In this example, there is a seed set of pages associated with every topic T in the hierarchy. Here, the seed set for a topic includes the seed sets of all of its subtopics, but may contain additional pages that are not in the seed sets of any of its subtopics. A pair of topics in this example is said to be unrelated if neither is an ancestor or descendant of the other. In other cases, these assumptions are not strictly adhered to. For example, other seed sets may be used as applicable.

Consider some topic T in H, and denote its seed set by S(T). Associated with each topic is also an excluded set of pages, which is denoted by E(T). In this case, the excluded set contains pages that are known not to belong to topic T. One way to construct E(T) is to set it equal to the union of the seed sets of all the topics in the hierarchy that are not subtopics of T (in particular, E(T)) includes the seed sets of the ancestors of T). Here, generically popular pages, such as Yahoo.com and Google.com are included in the seed set of the root of the hierarchy.

Suppose that each random surfer is in one of two states: relevant, and irrelevant. Initially, each surfer is in the irrelevant state. In some embodiments, surfers follow the following rules. When a surfer visits a seed set page, his state changes to relevant (independent of his prior state). These surfers are referred to herein as relevant surfers. When a surfer teleports at random, his state changes to irrelevant. These surfers are referred to herein as irrelevant surfers. When a surfer visits an excluded page, his state changes to irrelevant.

At any time t, let $M_R(p)$ denote the number of relevant surfers at node p. The relevance of p is the fraction of the surfers at p who are relevant. The relevance vector is denoted here by x and the relevance of p is denoted by x(p). Then:

$$x(p) = \frac{M_R(p)}{M(p)} \quad (54)$$

If p∈S(T), then $M_R(p)$=M(p), and so x(p)=1. If p∈E(T), then x(p)=0.

The iterative process described above can be modified to compute hierarchical topic relevance. One way this can be accomplished is by modifying the manner in which the excluded set is treated. The values for the excluded set can be pinned at 0 and not updated in the usual manner. At the 806 in this modified scheme, hierarchical topic relevance will have been computed.

Another approach is to estimate hierarchical relevance using the ordinary relevance. In the case where the excluded set contains a single page, a closed formula can be derived. In some embodiments, the matrix formulation of relevance is extended to incorporate excluded pages.

In some embodiments, instead of setting the relevance of the excluded pages to zero, set their relevance to a small non-zero value. A different value for each excluded page may be used, for example, depending on the relatedness of topics in the hierarchy.

In some embodiments, instead of (or in addition to) the excluded set, compute a value for each page that expresses its contribution to topic drift. This number may be measured in a manner similar to source scores in DIFR and will make relevance into a double-iterative algorithm like DIFR.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
selecting a topic from a hierarchy of topics;
receiving, from a user, a seed set including one or more seed pages for the topic;
receiving a document that is not associated with the topic;
using the seed to determine, with a processor, a topic destination score and a topic source score for the document relative to the document, the topic destination score indicating an amount of content in the document relating to the topic and the topic source score indicating reachability of content relating to the topic through the document;
receiving a query; and
returning the document as a result for the query based at least in part on the topic source score and the topic destination score for the document;
wherein returning the document as a result for the query based at least in part on the topic source score and the topic destination score for the document further comprises
calculating a topic score according to a weighted average of the topic source score and topic destination score; and
returning the document as a result for the query based at least in part on the topic score.

2. The method of claim 1 wherein the document is received as a result of a search.

3. The method of claim 1 wherein the seed is one or more seed sites.

4. The method of claim 1 wherein the seed is one or more seed terms.

5. The method of claim 1 wherein the seed represents a flavor.

6. The method of claim 1 wherein the seed is dynamic.

7. The method of claim 1 wherein the received document includes a portion of content accessible via the World Wide Web.

8. The method of claim 1 wherein the received document is included in an arbitrary document collection.

9. The method of claim 1 wherein the received document is included among a plurality of documents located on an intranet.

10. The method of claim 1 further comprising calculating a topic score according to the topic source score and topic destination score and determining whether to display an ad on the document based at least in part on the topic score.

11. The method of claim 1 further comprising calculating a topic score according to the topic source score and topic destination score and ordering the document among a set of search results based at least in part on the topic score.

12. The method of claim 1 further comprising calculating a topic score according to the topic source score and topic destination score and populating a directory based at least in part on the topic score.

13. The method of claim 1 further comprising calculating a topic score according to the topic source score and topic destination score and partitioning a collection of documents based at least in part on the topic score.

14. The method of claim 1 further comprising calculating a topic score according to the topic source score and topic destination score and categorizing a blog based at least in part on the topic score.

15. The method of claim 1 further comprising calculating a topic score according to the topic source score and topic destination score and identifying a spam site based at least in part on the topic score.

16. The method of claim 1 further comprising calculating a topic score according to the topic source score and topic destination score and identifying a pornographic site based at least in part on the topic score.

17. A system comprising:
a processor; and
a memory coupled to the processor, wherein the memory is configured to provide the processor with executable instructions to:
receive a topic from a hierarchy of topics;
receiving, from a user, a seed set including one or more seed pages for the topic;
receive a document that is not associated with the topic;
use the seed set to determine a source score and a destination score, the destination score indicating an amount content relating to the topic in the document and the source score indicating reachability of content relating to the topic through the document;
receive a query; and
return the document as a result for the query based at least in part on the source score and destination score;
wherein the memory is further configured to provide the processor with executable instructions to return the document as a result for the query based at least in part on the topic source score and the topic destination score for the document by
calculating a topic score according to a weighted average of the topic source score and topic destination score; and
returning the document as a result for the query based at least in part on the topic score.

18. The system of claim 17 wherein the seed is dynamic.

19. A computer program product for categorizing documents, the computer program product tangibly embodied in a non-transitory computer readable storage medium and comprising computer executable instructions for:
selecting a topic from a hierarchy of topics;
receiving, from a user, a seed set including one or more seed pages for a topic included in the hierarchy of topics;
receiving a document that is not associated with the topic;

using the seed to determine a source score and a destination score, the destination score indicating an amount of content relating to the topic in the document and the source score indicating reachability of content relating to the topic through the document;

receiving a query; and returning the document as a result for the query based at least in part on the source score and destination score;

wherein returning the document as a result for the query based at least in part on the topic source score and the topic destination score for the document further comprises calculating a topic score according to a weighted average of the topic source score and topic destination score; and returning the document as a result for the query based at least in part on the topic score.

20. A method comprising:

selecting a topic from a hierarchy of topics;

receiving, from a user, a seed set including one or more seed pages for the topic;

receiving a document that is not associated with the topic;

using the seed to determine, with a processor, a topic destination score and a topic source score for the document relative to the document, the topic destination score indicating an amount of content in the document relating to the topic and the topic source score indicating reachability of content relating to the topic through the document;

receiving a query; and returning the document as a result for the query based at least in part on the topic source score and the topic destination score for the document;

wherein the document is part of a document set; and wherein using the seed to determine the topic source score and topic destination score for the document further comprises;

determining a destination score according to a probability of arrival of a random surfer at the document during a random walk biased according to the seed set using a random surfer model; and determining a source score for the document according to a contribution of the document to destination scores of other documents in the document set.

21. A system comprising:

a processor; and a memory coupled to the processor, wherein the memory is configured to provide the processor with executable instructions to:

receive a topic from a hierarchy of topics;

receiving, from a user, a seed set including one or more seed pages for the topic;

receive a document that is not associated with the topic;

use the seed set to determine a source score and a destination score, the destination score indicating an amount of content relating to the topic in the document and the source score indicating the likelihood of reachability of content relating to the topic through the document;

receive a query; and return the document as a result for the query based at least in part on the source score and destination score wherein the document is part of a document set; and wherein the memory is further configured to provide the processor with executable instructions to use the seed to determine a source score and a destination score by:

determining a destination score according to a probability of arrival of a random surfer at the document during a random walk biased according to the seed set using a random surfer model; and determining a source score for the document according to a contribution of the document to destination scores of other documents in the document set.

22. A computer program product for categorizing documents, the computer program product tangibly embodied in a non-transitory computer readable storage medium and comprising computer executable instructions for:

selecting a topic from a hierarchy of topics;

receiving, from a user, a seed set including one or more seed pages for a topic included in the hierarchy of topics;

receiving a document that is not associated with the topic;

using the seed to determine a source score and a destination score, the destination score indicating an amount of content relating to the topic in the document and the source score indicating reachability of content relating to the topic through the document;

receiving a query; and returning the document as a result for the query based at least in part on the source score and destination score wherein the document is part of a document set; and wherein the computer program product further comprises computer executable instructions for:

determining a destination score according to a probability of arrival of a random surfer at the document during a random walk biased according to the seed set using a random surfer model; and determining a source score for the document according to a contribution of the document to destination scores of other documents in the document set.

* * * * *